Feb. 8, 1966 R. I. ROTH 3,234,524

PUSH-DOWN MEMORY

Filed May 28, 1962 8 Sheets-Sheet 1

INVENTOR.
ROBERT I. ROTH

BY Curtis Ailes Jr.

ATTORNEY

Feb. 8, 1966　　R. I. ROTH　　3,234,524

PUSH-DOWN MEMORY

Filed May 28, 1962　　8 Sheets-Sheet 6

Feb. 8, 1966 R. I. ROTH 3,234,524

PUSH-DOWN MEMORY

Filed May 28, 1962 8 Sheets-Sheet 7

United States Patent Office 3,234,524
Patented Feb. 8, 1966

3,234,524
PUSH-DOWN MEMORY
Robert I. Roth, Briarcliff Manor, N.Y., assignor to International Business Machines Corporation, New York, N.Y., a corporation of New York
Filed May 28, 1962, Ser. No. 198,239
12 Claims. (Cl. 340—172.5)

This invention relates to a push-down memory system which is adapted for the storage of a large number of words and in which all words are entered at the same end position of the memory. This invention relates more particularly to a push-down memory from which information can be removed from any word position based upon the information stored in a word position or based upon the order in which words have been stored in the memory, or based upon a combination of these factors.

A number of prior proposals have been made for push-down memory structures for use as "working" storage in conjunction with the arithmetic units of a computer. The push-down memory is generally of rather limited size and it is used primarily for temporary storage of various information words which are to be employed in the computations or manipulations. In these prior structures, the memory is referred to as a "push-down" memory because data words are always entered for storage at the top register of the memory and space is created for such storage by a downward shift of all of the words which are already previously stored in the memory.

In the prior push-down memory arrangements, the data words are removed from storage by a simple reversal of the input procedure. That is, the information is always removed at the top word register and all of the other data words in storage are then shifted upwardly by one word position. These prior push-down memories are thus limited to a strict rule of "last-in first-out" with respect to all of the data words stored. This rule of entry and read out has the basic virtue that no addresses are necessary for the purpose of finding a particular word, but it has a rather serious drawback that the program which is utilizing the words must be specially tailored to fit this rule of storage and read out. Furthermore, for other memory purposes, such as for general storage of data, this rule for removal of data is much too restrictive to be practical. However, if the usual direct fixed addressing rule for read out is to be attempted, then tremendous problems are encountered because the position of each data word within the memory is continually shifting as new data is entered. There is no assurance that any fixed address will continue to be valid.

Accordingly, one of the objects of the present invention is to provide a push-down memory structure in which individual words may be selected for read out on a basis other than a status as the last word entered into the memory.

Another object of the invention is to provide a push-down memory structure which can be of unlimited size by virtue of the property that individual words may be removed from the memory on a basis other than the status of having been written into the memory last.

Another object of the present invention is to provide a new and improved push-down memory structure in which words may be selected for read out on the basis of the sequence of numbers stored within a field of the words.

Another object of the present invention is to provide an improved push-down memory structure in which an individual word may be selected for read out upon the basis of an associative test regardless of the position of the word within the memory.

Another object of the present invention is to provide an improved push-down memory structure in which a single word is selected for read out on the basis of one or both of the above mentioned tests and in which a single word is finally selected if two or more words pass such tests, the single word being selected from the class passing such tests on the basis of the order in which the data words were entered into the memory.

Another object of the present invention is to provide an improved push-down memory structure which satisfies the above objectives, and in which the individual word selected to be read out from a larger class meeting other tests is the word which was first entered into the memory which belongs to that class.

Another object of the present invention is to provide an improved push-down memory system which is capable of re-arranging the words stored within it in an order determined by numerical values stored within a particular field of the words.

In a computer employing a memory having fixed addresses, the individual program instruction records and data records are accessible to the computer processing unit from the memory only in response to the specific memory addresses. The use of specific addresses requires that the instruction and data records must be carefully stored in the memory spaces which are assigned such addresses, and in no other place. The addresses of the data and instruction records to be called forth must be stored in prior instruction or data records, or must be generated by the processing unit. In general, such computers operate in a mode which is similar to that which would be followed by an individual human in performing similar operations either on the basis of a set of instructions or on the basis of procedures previously learned and permanently stored in the human brain. Such operations might be characterized as "single track" since basically only a single step is accomplished at one time, even though the individual steps may be accomplished with extreme rapidity.

Various suggestions and inventions have been made for the purpose of avoiding the requirement of specific memory addresses for data and instruction "word" records in order to improve the efficiency of memory utilization. One class of these is referred to by the term "associative memories" in which data may be "addressed" or called for on the basis of information contained in all or a part of the record itself. This class of memories is very useful for many purposes. However, there is one important recurring operation required for data storage memories which is not conveniently and efficiently fulfilled either by the traditional memory systems or by the associative memory systems. This is the operation in which instruction or data records or words are to be called forth in an ordered sequence, and particularly if the sequence is not necessarily completely filled, that is, where there may be large numerical gaps in the sequence.

The traditional method for solving the problem of obtaining an ordered availability of data records is to provide for a physical sorting of such records such as by a numerical sorting of data cards. An analogous procedure is available with records stored upon magnetic tapes, in which records from two tapes are selectively transferred to a third tape to form sequences. This is repeated with two parts of the third tape data, and after a number of repetitions there is eventally produced a single tape with all records of the set physically sorted in the desired order. The present invention avoids the necessity for all such physical sorting.

It is one object of the present invention to provide a memory in which records may be stored by the push-down principle resulting in a more or less random arrangement and in which such records may be recalled from the memory for read out in order, or in an ordered sequence, without the necessity for any physical sorting or re-arrangement of records.

As mentioned above, the prior memory data storage systems rely basically upon a "one track" addressing or interrogation system.

It is another object of the present invention to provide a system which may be characterized as a multiple track interrogation system, combined in a push-down memory system, which has the capability of simultaneously establishing a comparison of the ordering field of each word with the ordering field of every other word in the memory, and for indicating or reading out the word (or one of the words) having a selected extreme value (either the highest or the lowest) in the ordering field.

Another object of the invention is to provide a push-down memory with ordered read out which does not require any interrogation register.

Another object of the present invention is to provide a push-down memory with ordered read out in which the reading out of records proceeds in sequence to a predetermined limit value in the ordering field, and then automatically stops.

Another object of the present invention is to provide a push-down memory with ordered read out according to one or more of the previous objects which is particularly well adapted for embodiment in cryogenic circuitry.

Various proposals have been made for computer systems having more than one arithmetic or processing unit. One of the most serious problems in such systems is to provide for an efficient flow of instructions and data to the various processing units. Some systems of this kind approach this problem by employing queuing memories for the purpose of temporarily storing information which is to be handled by a particular arithmetic unit. The information may be called out of the queuing memory for use on the basis of data stored within an ordering field.

Accordingly, it is another object of the present invention to provide a push-down memory with ordered read out which is particularly well adapted to provide the function of a queuing memory for a computer system empoying more than one processing unit.

In carrying out the above objects of the invention in one preferred embodiment thereof there may be provided a push-down memory system for binary information which provides an ordered read out of words in sequence proceeding from one extreme value to the other including a plurality of word storage registers, and apparatus for entering each word to be stored into the upper end storage register of the memory. Interconnecting apparatus is provided for the word storage registers and operable during the entry of a new word to shift all words stored in storage registers above the uppermost empty word storage register so that each such shifted word will occupy the next lower storage register to make room for said new word. A condition detection apparatus is provided for each digit in each register, and each such apparatus is active in the presence of an input signal for indicating first and second conditions of the associated digit, one of said conditions being the "zero" condition and the other being the "one" condition. An input signal source is provided for each condition detection apparatus for the highest order column, and each condition detection apparatus is operable when active to provide an output signal in response to the first condition and to provide an alternative output signal in the presence of the second condition at all of the active condition detection apparatus for the associated column. Each condition detection apparatus is connected to provide either of the output signals therefrom as an input signal to any lower order condition detection apparatus for the same storage register, an output signal from any condition detection apparatus of the lowest order constituting a word selection control signal indicating an extreme value word selected to be read out. A read out apparatus is provided to read out the word from a single selected register, and suppression apparatus is provided which is thereafter operable to make the condition detection apparatus for that word storage register inactive by suppressing the source of the input signal thereto.

For a more complete understanding of the invention, reference should be made to the following description and the accompanying drawings as follows.

Figure 1:
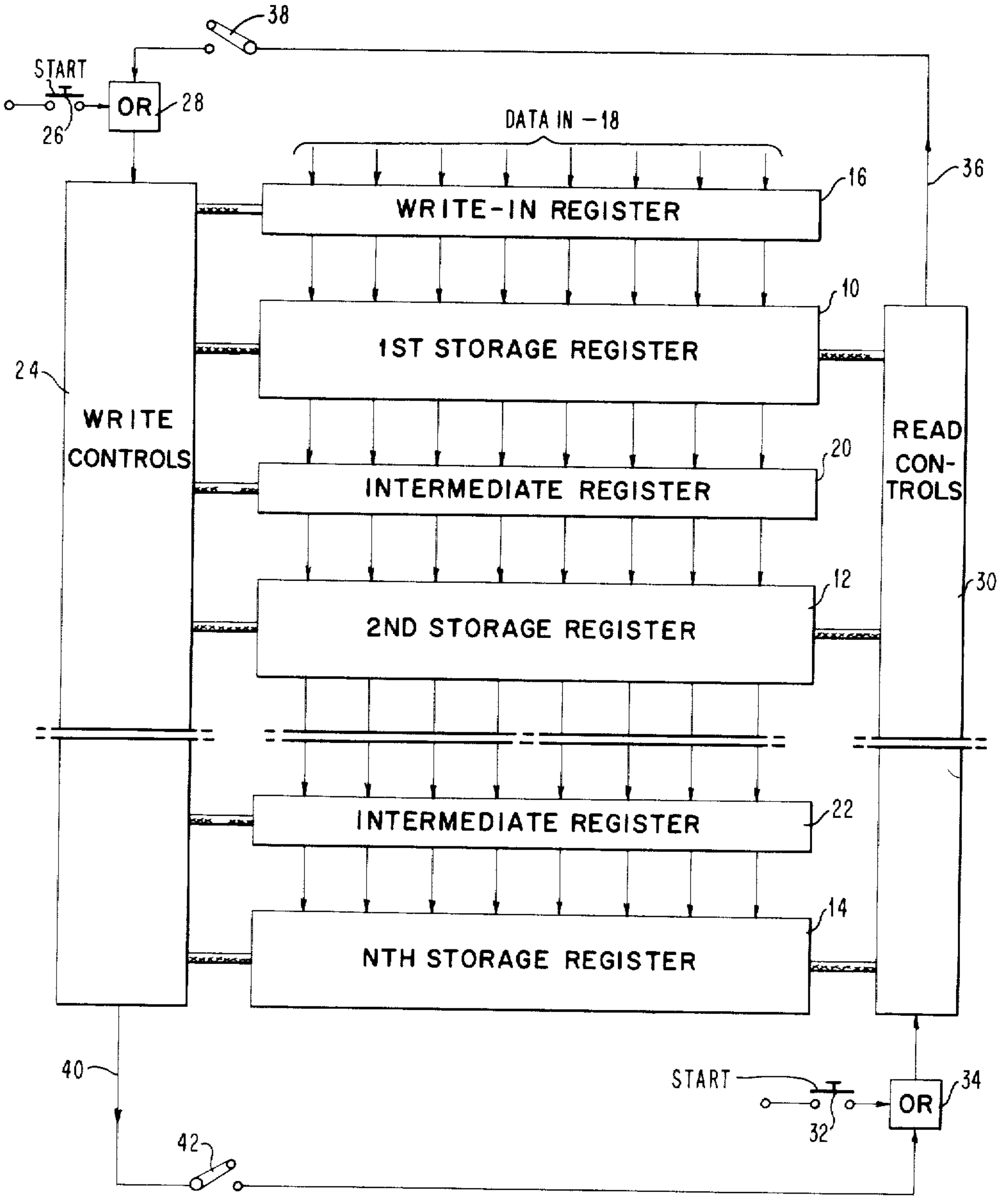
FIG. 1 is a schematic diagram illustrating a preferred form of the invention.
Figure 4:
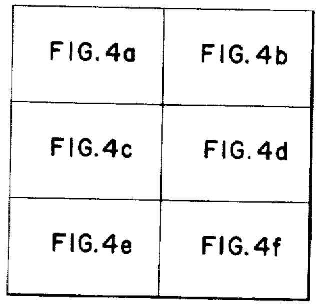
Figure 4A:
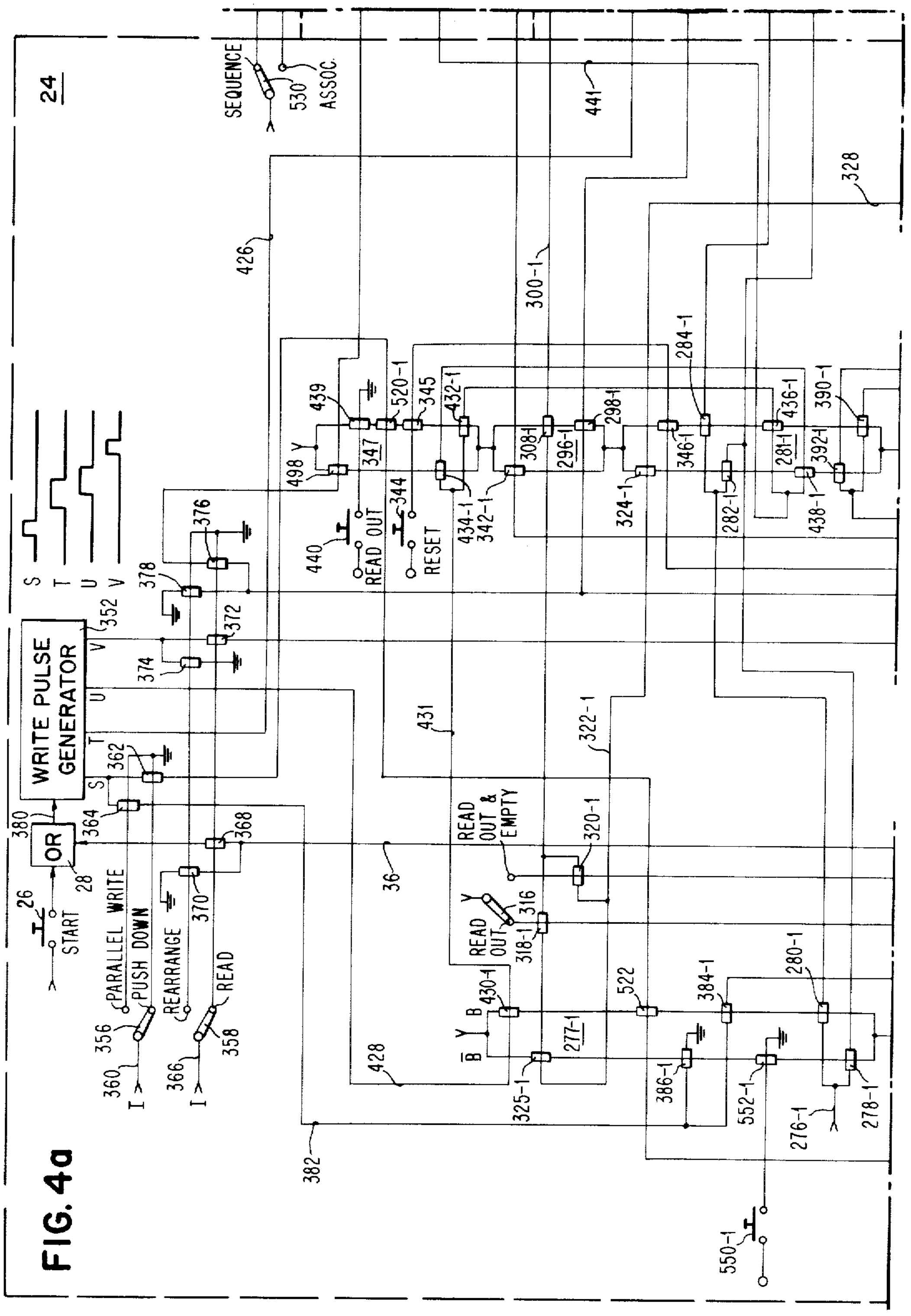
Figure 4B:
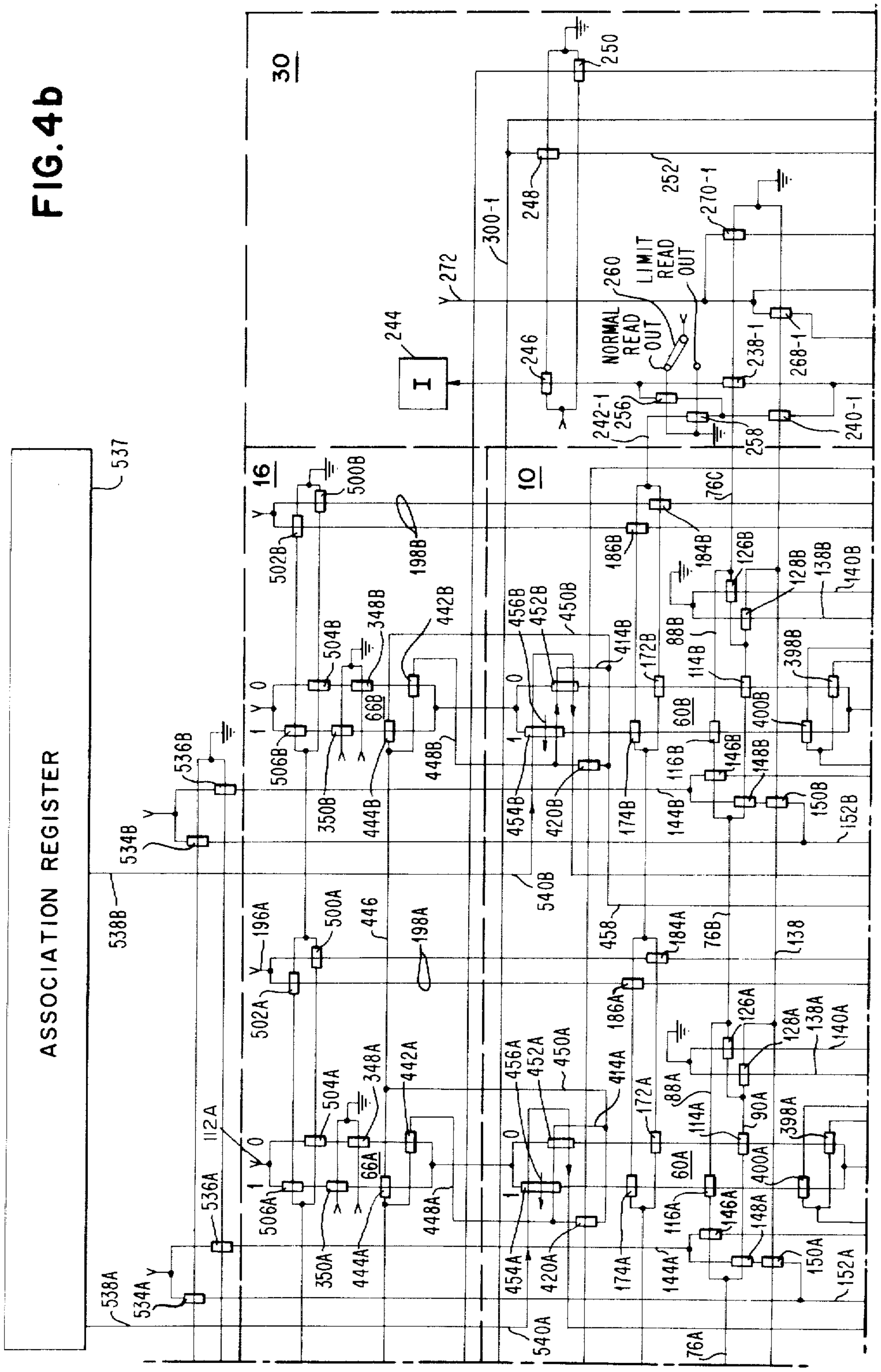
Figure 4C:
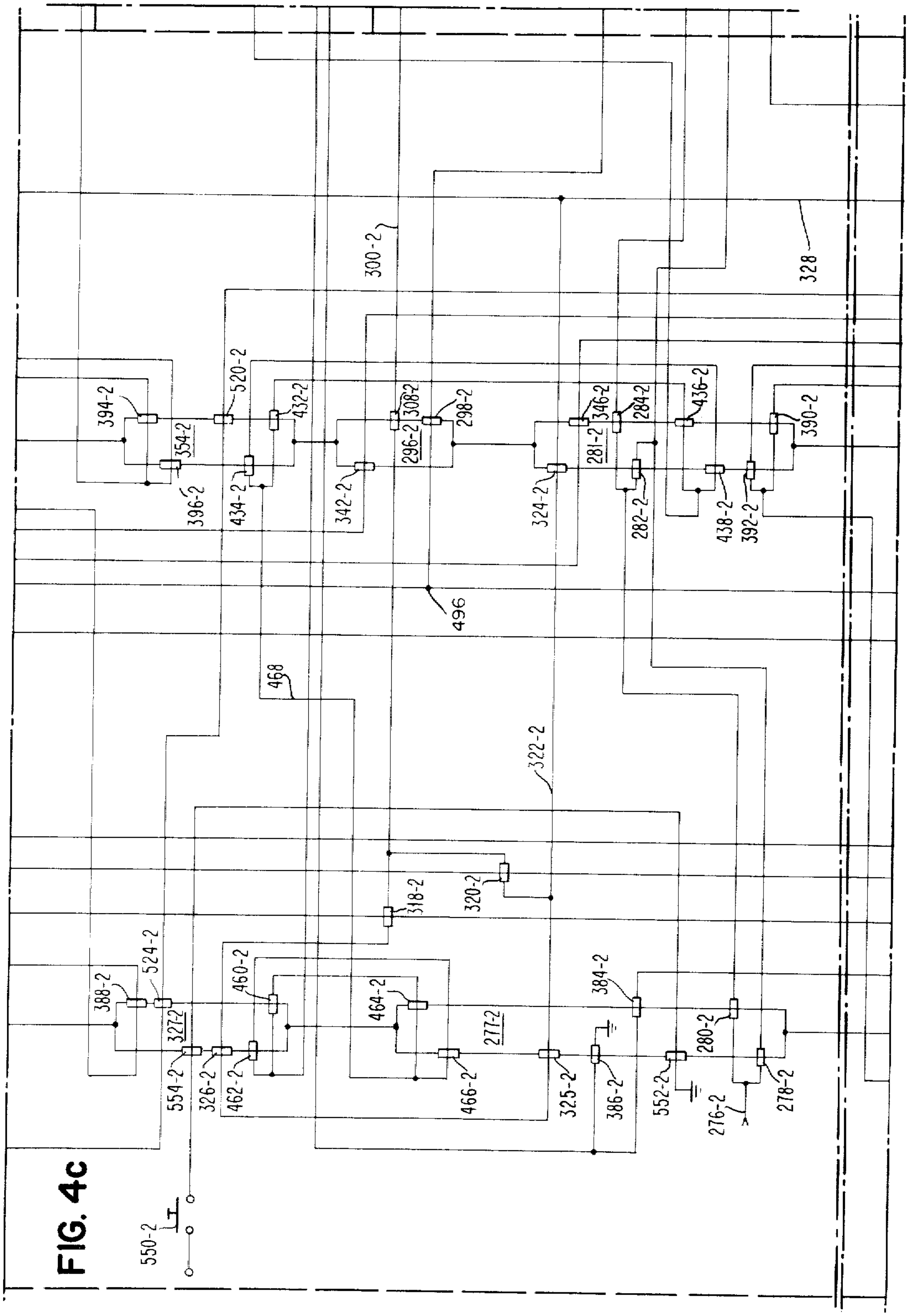
Figure 4D:
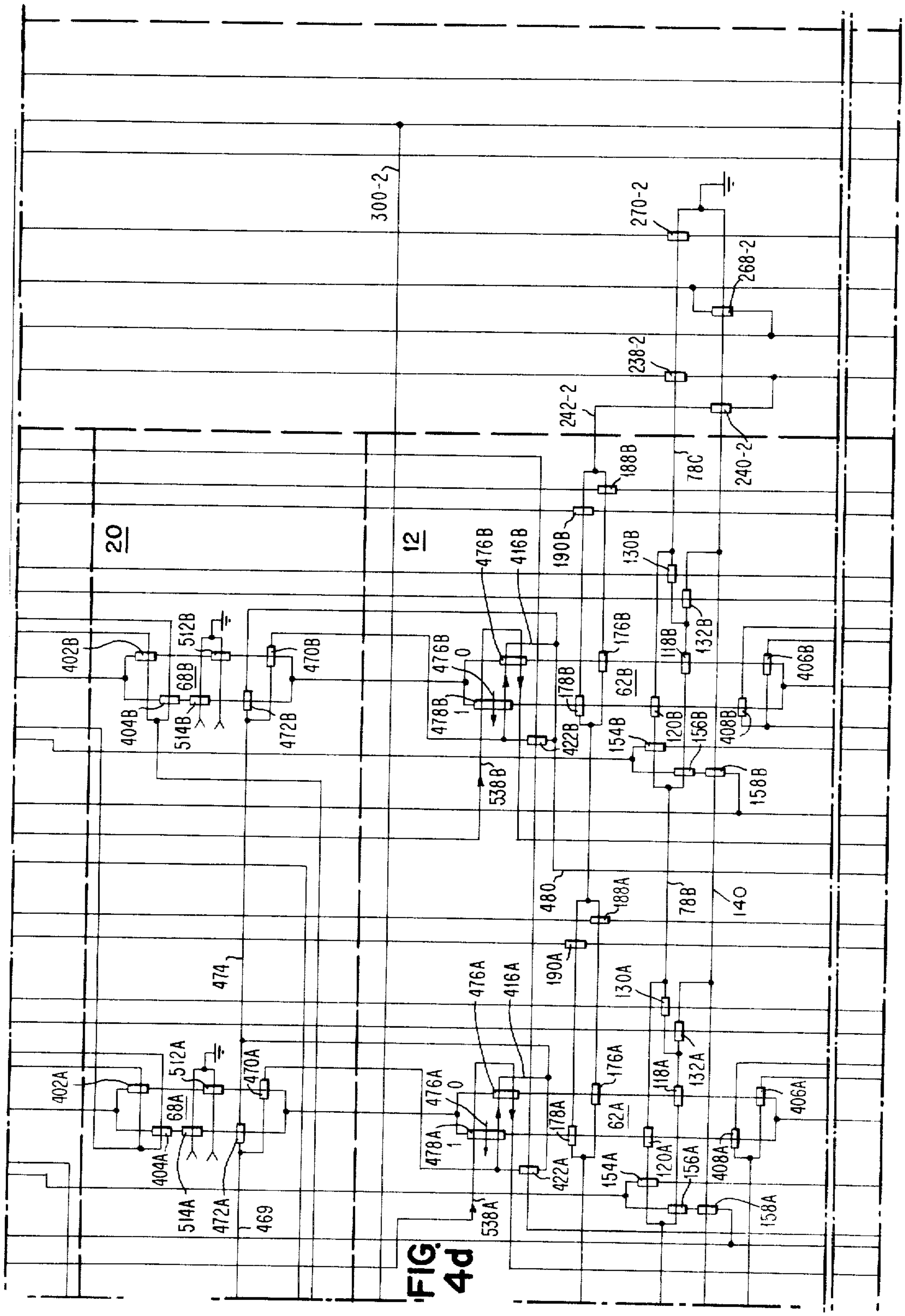
Figure 4E:
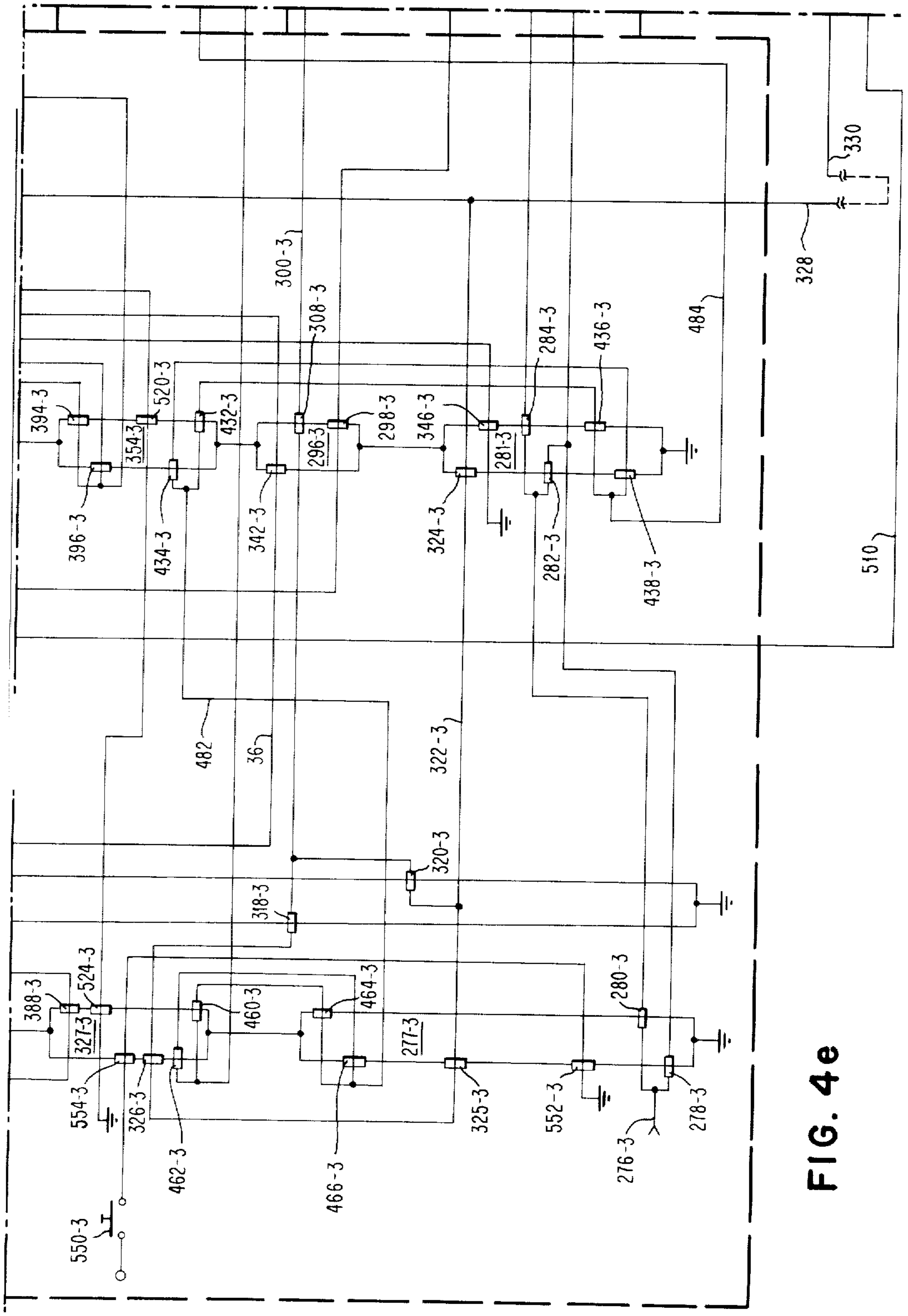
Figure 4F:
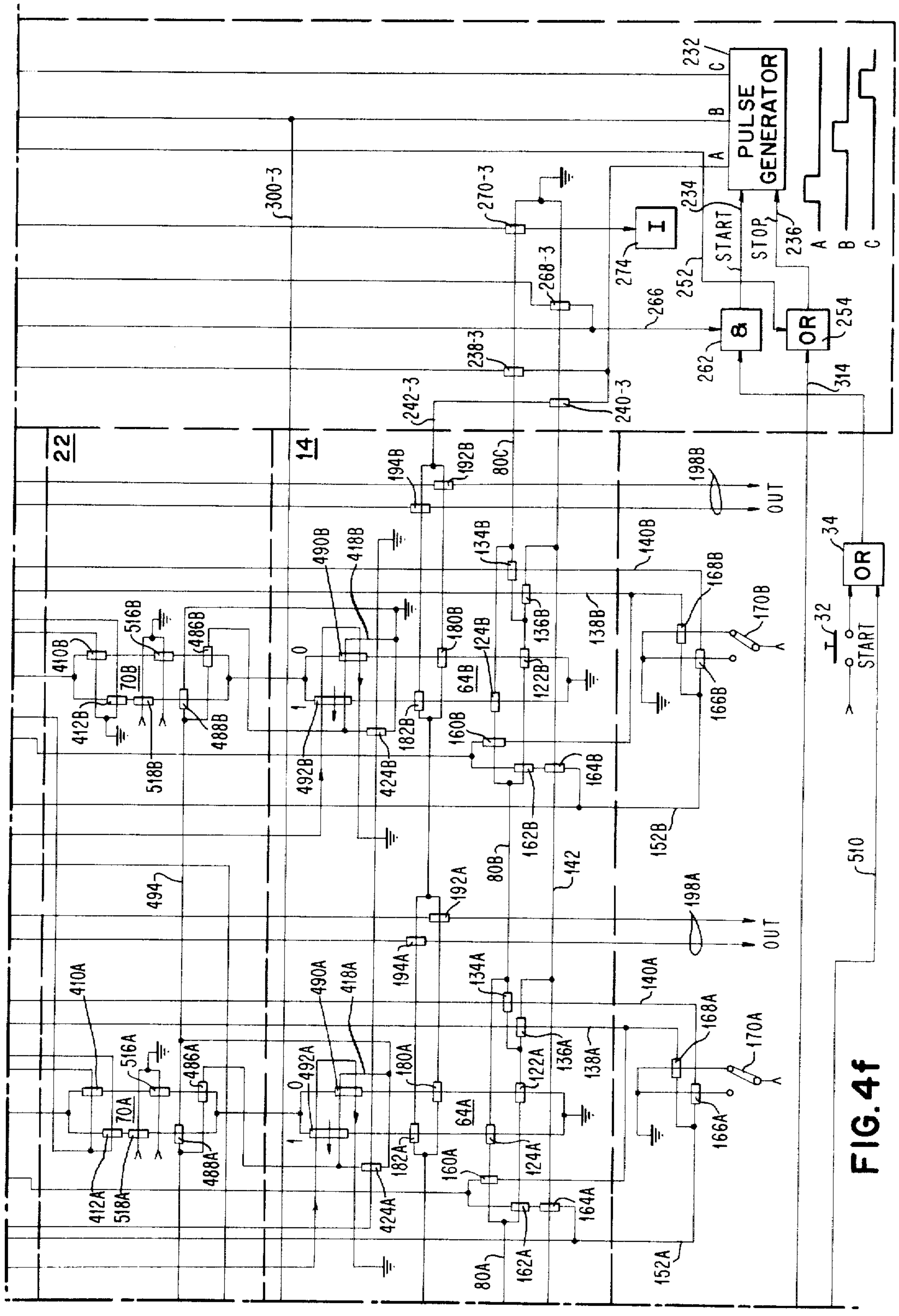

FIG. 4, which is composed of a combination of FIGS. 4*a* through 4*f*, is a schematic circuit diagram of a cryogenic embodiment of the present invention. Referring more particularly to FIG. 1, a push-down memory system is shown including a number of word storage registers 10, 12, and 14. Immediately above the first storage register 10 there is a write-in register 16 through which data is entered to the memory as indicated by the input lines at 18. Intermediate registers such as those indicated at 20 and 22 are provided above each of the storage registers after the first storage register. Each of the intermediate registers 20 and 22 serve to pass information downwardly in the memory from the storage register directly above to the storage register directly below the intermediate register. This shift of information words takes place as new words are written into the memory. Thus, as a new word is placed in the write-in register 16, the word in the first storage register 10 is placed in the intermediate register 20. Then, as the new word is shifted into the first storage register 10 from the write-in register 16, the word previously in the first storage register 10 is transferred from the intermediate register 20 to the second storage register 12. In this same manner, the words in all of the uppermost storage registers which are occupied are shifted downwardly by one storage register position whenever a new word is written into the memory. This writing operation together with the associated shifting operation is carried out under the control of write controls indicated at 24. The writing and shifting operation may be started by activating the write controls 24 through a starting circuit indicated schematically by a start switch 26 and an OR circuit 28.

It should be understood that the term "push-down" as used throughout this specification in describing the method of loading or storage of information in the memory is intended as a functional term. Thus, this feature might be just as well described as "push-in" or "push-up," rather than "push-down." It is conceivable, for instance, that the first storage register might actually be physically positioned somewhere near the center of the memory structure rather than at one end. Such a structure would still be within the spirit of the present invention so long as the words were always loaded or entered into the memory through the first storage register and "pushed-in" through the same sequence of related storage registers. Thus, "push-down" is a functional rather than a positional term. Furthermore, the first storage register will sometimes be referred to hereinafter as the "upper-end" storage register. It will be appreciated that this term again is to be considered as a functional term rather than necessarily being a positional one.

It is an important feature of the present invention that words may be selected and read out from any storage register based upon information contained within that storage register. In particular, it is contemplated that words may be selected for read out on the basis of the sequential order of a number which is stored within a particular field of each of the words. This selection of individual words for read out is accomplished by read controls indicated at 30. The structure and operation of the read controls 30 and associated circuitry within the storage registers 10, 12, and 14 will be described more fully below in connection with the detailed embodiment of FIG. 4. The reading operation may be initiated by energizing the read controls 30 through a starting circuit schematically illustrated by a start switch 32 and an OR circuit 34.

The read controls 30 are provided with an output circuit indicated at 36 upon which a signal pulse appears each time the reading of a single word is completed. It is possible to operate a system of the present invention in such a way that each word which is read out is in turn written into the memory again through the write-in register 16. If this mode of operation is desired, the signal on the read control output line 36 may be supplied through a switch 38 to start the write controls 24 through the OR circuit 28. The write controls 24 are also provided with an output line indicated at 40 on which an output pulse normally appears at the end of each write operation. If it is desired to continue the mode of operation in which each word which is read out is then again written into the memory, the signal on line 40 can be supplied through the switch schematically shown at 42 to the OR circuit 34 to restart the read controls 30. By continuing to read out and restore each word in the memory, the memory rearranges itself so that the order of words in the storage registers corresponds inversely to the order in which the words were selected for read out. If the selection is based upon numerical order, then the words are arranged in the memory in numerical order.

Included within the write controls 24 there are storage devices for each storage register to indicate which words have already been read out and restored for rearrangement. Furthermore, the read controls 30 are arranged to operate only when there is at least one word remaining in the memory which has not yet been read out and rearranged. Accordingly, when the rearrangement is complete, no further read out occurs, and no further output pulses appear at connection 36. The details of these and other features will be shown and described in connection with FIG. 4.

The system of FIG. 1 is particularly well adapted for embodiment in cryogenic circuitry employing cryotron switching devices. A detailed schematic circuit diagram of such a system is shown in FIG. 4. However, before proceeding with a more detailed description of that system, a description of the cryotrons and the cryotron circuit notation employed in FIG. 4 is given below in conjunction with FIGS. 2 and 3.

The term "cryotron," as used in the present specification, refers to cryogenic gating devices composed of materials which are said to be normally superconductive when maintained at very low temperatures such as may be achieved by immersion in liquid helium, for example. These cryotron gating devices include a main or gate conductor of superconductive material and a separate control conductor arranged such that when a current is provided in the control conductor, it is effective to produce a magnetic field which causes the gate conductor to lose at least some of its superconductive properties so that the gate conductor becomes resistive.

Figure 2:
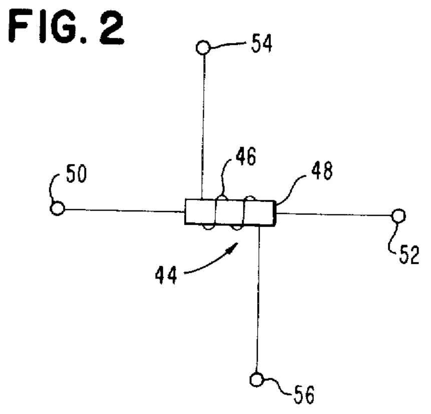
FIG. 2 illustrates, in schematic form, a cryotron, a four terminal device which is useful in the construction of physical embodiments of the present invention.

FIG. 2 illustrates such a cryotron device 44 having a control winding 46 around a gate element 48. The current to be gated or controlled flows through the gate element 48 between terminals 50 and 52, while the control current which causes such gating flows through the winding 46 between terminals 54 and 56.

Figure 3:
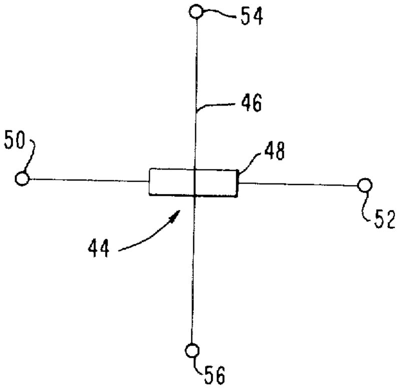
FIG. 3 is a simplified representation of the cryotron of FIG. 2 which is employed in FIG. 4 relating to a cryogenic embodiment of the present invention.

In FIG. 3, the cryotron of FIG. 2 is illustrated in a simplified form, the same reference numerals being employed to designate corresponding parts. It is to be seen that the only difference is that the winding 46 is represented in FIG. 3 simply by a conductor disposed across gate element 48. This simplified representation of a cryotron is employed in the following figures showing a cryogenic embodiment of the present invention. In this system, the circuit lines or wires and the control conductor or winding 46 of each cryotron may be composed of a so-called "hard" superconductor material such as niobium or lead. On the other hand, the gate element 48 of each cryotron may be composed of a "soft" superconductor material such as tantalum or tin, for instance. The current employed is such that the current in the control winding 46 creates a magnetic field which exceeds the critical field value to cause the gate 48 to become resistive, but the field does not exceed such a critical value with respect to the material of the control winding 46 and the interconnecting lines and wires, so that these elements remain substantially superconductive.

When two gate conductors are electrically connected in parallel, one being superconducting and the other being resistive, a current flowing to the parallel combination will flow entirely through the superconducting gate, although the other gate may exhibit only a few tenths of an ohm resistance. Then, if the resistive gate is allowed to become superconducting, the current will continue to flow through the original superconducting gate. Thus, current is caused to flow through a selected path which is maintained superconducting and such current will continue to flow in that path even if other parallel paths later become superconducting.

It is to be understood that the cryotron devices may be constructed of thin films such as are shown and described in co-pending application Serial No. 625,512, filed November 30, 1956, by R. L. Garwin and entitled "Fast Cryotrons" and assigned to the same assignee as the present invention. Additional information on cryogenic superconductive gating devices and certain logical circuits which may be created with such devices is contained in an article by D. A. Buck entitled "The Cryotron—A Superconductive Computer Component" in Proceedings of the IRE, volume 44, No. 4, pages 482–493, April 1956.

FIG. 4 shows how FIGS. 4*a* through 4*f* are to be combined to form a schematic diagram of a cryogenic embodiment of the system of FIG. 1. FIGS. 4*a* through 4*f* will sometimes be referred to collectively below simply as FIG. 4. In the embodiment of FIG. 4, in so far as practical, the parts and components of the system are identified by the same numbers as were used for the corresponding parts of FIG. 1.

*General description of FIG. 4*

In the detailed circuit diagram of FIG. 4, the various sections of the system which were shown by schematic blocks in FIG. 1 are divided by heavy dashed lines and each such section is identified in its upper left hand corner with the same number as used in FIG. 1. As in FIG. 1, only three storage registers 10, 12, and 14 are shown in FIG. 4. However, it will be understood that it is intended that the present invention may be constructed in almost any desired size such as ten words, hundreds of words, or even thousands of words. Also, for simplicity there is shown only the apparatus necessary for the storage of a two digit word in each of the storage registers. However, it will be understood that the system is intended to be produced in expanded word size by the addition of more binary bit storage flip-flops. The storage flip-flops in the first storage register 10 are indicated at 60A and 60B. Similarly, the flip-flops in storage registers 12 and 14 are shown at 62A, 62B, 64A, and 64B. The corresponding storage flip-flops in the write-in register 16 are shown at 66A and 66B and those in the intermediate registers 20 and 22 are shown at 68A and 68B and 70A and 70B.

In connection with the description of FIG. 1, the principle of the push-down method of storing words in the memory was explained. Detailed circuitry for accomplishing this storage function is shown in FIG. 4. The FIG. 4 circuit also includes apparatus for selecting and reading out the words stored in the memory based on the numerical order of information stored within one or more fields of the words themselves. The first portion of the description of the system of FIG. 4 is particularly devoted to those components of the system which are related to the read out operation. The detailed description of the apparatus particularly related to the storage function then follows.

The individual flip-flops of the storage registers, and the associated apparatus, will be explained by reference for example to flip-flop 60A which is the high order flip-flop in the first storage register 10. As indicated in the drawing, the presence of the cryogenic current in the right leg of flip-flop 60A signifies the storage of a binary zero digit. Alternatively, the presence of current in the left leg of flip-flop 60A signifies the storage of a binary one digit. A current may be continuously supplied to the flip-flops 60A and to the other flip-flops in the high order column of the registers through the connection indicated at 112A from a conventional current source (not shown).

*Read out structure of FIG. 4*

As explained briefly in connection with FIG. 1, words may be selected for read out on the basis of the numerical value of the information contained within one or more fields of the word. The selection for read out may start and proceed from one extreme numerical value to the other. Thus, the read out of individual words may proceed from the lowest valued word to the highest, or from the highest to the lowest. The structure of FIG. 4 is described in terms of a sequence proceeding from the lowest valued to the highest valued words, but only a minor modification of the system is necessary for operation in the opposite sequence.

Basically, the circuitry accomplishes a column by column comparison of each word with every other word, with the highest priority given to the highest order columns. Thus, in the low to high read out selection sequence, any word which contains a binary zero is retained in the class for comparisons at lower orders, while any words which contain a binary one are rejected since they obviously cannot be the lowest valued word. However, if all words contain binary ones in the highest order, then all must be retained in the selected class for further comparisons, since no distinction can be made. These principles are applied in each order until the lowest valued word (or words) is selected.

A detailed description of the circuitry in FIG. 4 which accomplishes these functions follows: The "zero" branch or leg of flip-flop 60A includes the control winding of a cryotron 114A and the "one" leg includes the control winding of a cryotron 116A. These two last mentioned cryotrons perform gating functions. They are operable to gate the current in a flip-flop condition detection circuit from an input connection 76A to either a "zero" detection output 88A, or to a "one" detection output 90A. Similar condition detection gate cryotrons are shown for flip-flop 62A at 118A and 120A, and for flip-flop 64A at 122A and 124A.

The current at 76A must pass through either the gate of cryotron 114A or the gate of cryotron 116A. If flip-flop 60A stores a "zero," signified by a current in the zero line including the winding of cryotron 114A, then the current from 76A is caused to traverse the gate of 116A to the zero condition detection circuit output 88A. Conversely, the storage of a "one" in flip-flop 60A is signified by a current in the control winding of cryotron 116A, and then the 76A current is forced to travel through the gate of cryotron 114A to the "one" condition detection circuit output 90A. It is apparent from the drawing that the current in the zero output 88A continues on to provide the current at a connection 76B which is the input connection for the condition detection circuit at flip-flop 60B for the next lower order digit of the same word.

An "all ones" gate function is provided by the cryotrons 126A and 128A and the circuitry associated therewith. Corresponding "all ones" gate functions are provided at the second and third word levels by cryotrons

130A, 132A, and 134A, and 136A. If the all ones condition exists in all of the active flip-flops in the first column of the storage registers, then a current is provided on the line 138A which traverses the control winding of cryotron 128A. This causes any ones detection current appearing at condition detection circuit output 90A to be transferred through the gate of cryotron 126A to join the output connection 88A and to provide an input to 76B. On the other hand, if the "all ones" condition is not detected, then a current is provided on line 140A which traverses the control winding of cryotron 126A so that the 90A current must transverse the gate of cryotron 128A. This signifies the elimination of the word stored in register 10 from the selection since no current is thus supplied to condition detection circuit input 76B. The current traversing the gate of cryotron 128A is supplied instead to a word rejection current line 138. Similar word rejection current lines are provided at the second and third word levels at 140 and 142. The current in the word rejection current line 138 is used in opposition to the condition detection circuit current such as that in line 76B, and in opposition to the word selection outputs, such as may appear at connection 76C, for various switching functions as will be described in more detail below.

The all ones detection circuit includes an input connection indicated at 144A which is supplied with a current from a conventional current source (not shown). This current traverses either the gate of cryotron 146A or the gate of cryotron 148A and the gate of cryotron 150A. Since the control winding of the cryotron 146A forms part of the zero detection branch 88A of the condition detection circuit, whenever a zero is detected in flip-flop 60A by this 88A circuit, the 146A cryotron is resistive, forcing the current from 144A through the gates of cryotron 148A and 150A to the line 152A. A current in the 152A line thus signifies the presence of a zero. Similar circuitry is provided at each word level in each column. At the second word level the cryotrons are identified at 154A, 156A, and 158A, and at the third word level they are identified as 160A, 162A, and 164A.

It is apparent that a shift to the left of the current originating at 144A into line 152A at any of the three word levels through the operation of cryotrons 146A, 154A, and 160A will signify the existence of at least one zero in the column so that the all ones condition is not fulfilled. The line 152A extends through the gate of a cryotron 166A to become the control line 140A which controls the all ones gate cryotrons 126A, 130A, and 134A as described above. This assumes that the cryotron 168A shown at the bottom of the diagram is resistive. If the ordering control circuitry and all the ones detection circuit for the first column is to be effective, the cryotron 168A must be resistive. This is accomplished by a select suppress control function provided by apparatus schematically illustrated by switch 170A through which a current is suppled to the control winding of cryotron 168A. If the ordering control circuitry is to be suppressed for this first column, then the column suppress control switch 170A is shifted to the left to make cryotron 166A resistive and to permit cryotron 168A to become conductive, thus diverting the current from line 152A to the line 138A to close the gates of the all ones circuit cryotrons 128A, 132A, and 136A. As explained above, when this line 138A is energized, the condition detection circuits will not distinguish between zeros and ones, since the ones detection currents, such as the current in line 90A are cross connected, such as through the cryotron gate 126A, to continue the word selection current to input 76B.

Returning again to the description of the operation of cryotrons 146A, 148A, and 150A, it is apparent that if a binary one exists in flip-flop 60A, then the resultant condition detection circuit current in branch 90A, which includes the control winding of cryotron 148A, will cause the current from source 144A to traverse the gate of cryotron 146A. If a one is likewise stored in each of the other levels, the current continues down the right branch circuits through the gates of cryotrons 154A and 160A to provide the control current to line 138A to signify the all ones condition. However, as mentioned above, if a zero is stored at any one of the three word levels, the current will be diverted to the left into line 152A since the all ones condition then does not exist.

If any word is to be omitted from the group from which a selection is to be made, a current will exist on the word rejection current line 138, for instance, at the control winding of cryotron 150B. If the first word has been eliminated from the selection by the diversion of the word selection current through the gate of cryotron 128A, then the current will exist at the second digit of the first word at the control winding of cryotron 150B. This condition would occur in the presence of the storage of a one in flip-flop 60A in conjunction with a storage of a zero in any one or more of the flip-flops 62A and 64A.

From the above, it is clear that in the all ones detection circuitry including the cryotrons 146A, 148A, and 150A, a prior rejection of the word as signified by a current in the control winding of a cryotron such as 150A accomplishes the same control function as the indication of a "one" signified by a current in the control winding of cryotron 148A. This is proper because the "all ones" detection circuit must be sensitive to the existence of the "all ones" condition whenever it exists in all of the words which remain in the class from which the selection is to be made. Stated another way, the existence of a "zero" in a particular word at a particular digit order is significant only if the associated word could be selected at the word having the lowest value based upon the comparison of the present order column and the higher order columns.

After the selection of a particular word for read out, the actual transfer of information from the individual digit flip-flops of the register storing that word is accomplished by a read out information transfer circuit. At the flip-flop 60A, for instance, this read out information transfer circuit includes the gates of cryotrons 172A and 174A which have control windings respectively connected in series in the zero and one branch circuits of the flip-flop 60A. Counterparts of these read out information transfer cryotrons are found at the second and third word levels at 176A, 180A, and 182A. The information to be read out is transferred by means of the circuit including the cryotrons 172A and 174A to a read out bus having alternate circuit cryotrons 184A and 186A connected to gate the read out bus current by means of control currents derived from the read out information transfer circuit. Again, similar read out bus cryotrons are shown for the second and third word levels at 188A, 190A, 192A, and 194A. The read out bus may be supplied continuously with a current through connection 196A from a conventional current source (not shown). When information is to be read out, the read out information transfer circuit including the gates of cryotrons 172A and 174A is supplied with a pulse of current which transfers the information from flip-flop 60A to the read out bus including the cryotrons 184A and 186A. The current in the read out bus remains switched to correspond to the information stored in flip-flop 60A even after the read out information transfer circuit is deenergized. This is true because of the inherent storage characteristic of cryotron circuits. The data to be read out thus appears as a signal current on either one of the two lines of the read out bus as indicated at 198A. The operation of the circuits is the same at each word level and at each digit position of each word. The controls which provide the proper read out information transfer circuit current pulse at the proper word level and at the proper time are described in detail below in connection with the description of the read control section 30 of the system.

While much of the preceding description of FIG. 4 has referred specifically to the circuit components associated with flip-flop 60A, it is apparent that the cryotron components and circuitry associated with each of the other flip-flops 62A, 64A, 60B, 62B, and 64B are substantially identical in construction and operation. Also, the components associated with the B column flip-flops 60B, 62B, and 64B are lettered similarly to the corresponding components in the A column except for the substitution of a B suffix.

While the system of FIG. 4 is basically a unitary system, as explained above, it is described here in sections for the purpose of clarity. Immediately above, there was described the central portion of the system including the various registers shown in the central portion of the diagram. The control portions in this system are shown at the left and right ends of the diagram. There is no particular functional significance to the physical separation of the left control section and the right control section since apparatus in each of these control sections cooperates with all of the other apparatus, and with the apparatus previously described in the central section of the system to provide the desired over-all system operation. However, all of the controls for the writing function are to be found at the left in the diagram.

The control circuits of FIG. 4 operate from pulses supplied from a pulse generator 232 shown in the bottom right corner of the figure. Since this pulse generator 232 may be of conventional construction, for simplicity and clarity, the details of construction are not shown here. However, the pulse generator 232 is of the type which will start when it receives a signal at a start input line 234 and which then emits a series of three pulses in sequence at the three output lines identified as A, B, and C and which continues to emit successive series of A, B, and C pulses on those output lines until a stop signal is received upon the stop signal input line 236. In each case, the current series of A, B, C pulses is completed after the stop signal is received. That is, if the stop signal is received at the "B" pulse time, then the pulse generator continues by emitting a final C pulse before it stops.

In the above description for the operation of the central section of the system of FIG. 4, it was explained that if a word is selected as having the lowest value, the result is a selection circuit output current which will appear at 76C for the first word, at 78C for the second word, or at 80C for the third word. If the corresponding words are rejected, the current is directed instead to the lines 138, 140, or 142 respectively for each of the three words. The control circuits contain cryotrons shown at 238–1, 238–2, and 238–3 for detecting the selection of each of the three words of the memory in terms of a current on each of the respective word selection lines. Corresponding cryotrons are shown at 240–1, 240–2, and 240–3 for detecting the rejection of each of these three words. The circuits including the various 238 and 240 cryotrons are connected to the A pulse output line of the pulse generator 232. When the system is being operated for read out, the A pulse current travels upwardly in these circuits to the level of the lowest positioned word which has been selected. If the third word has been rejected, the cryotron 240–3 will be resistive and the current will continue upwardly through the gate of cryotron 238–3. Similarly, if the second word has been rejected, cryotron 240–2 will be resistive, and the current will continue upwardly through cryotron 238–2. If the third word is selected, then the cryotron 238–3 will be resistive and the A pulse current will transverse the gate 240–3 into connection 242–3. However, if the third word is rejected and the second word is selected, then the current will traverse the gate of cryotron 238–3 and the gate of cryotron 240–2 to the connection 242–2. It will be apparent that if the third word is selected, and if the second word also is selected, the A pulse current will be supplied to connection 242–3 since it will not be able to traverse the cryotron 238–3 so as to reach the second word level. The connections 242–1, 242–2, and 242–3 are the individual current supply connections for the information transfer circuits for read out. It is quite apparent from this explanation that the lowest positioned word which meets the selection test is always the first to be read out. Since the words are loaded in memory from the top, with older words being pushed down, this means that the oldest word meeting the selection test will always be read out first. The "A" pulse circuitry described in this paragraph is similar in many respects to read out control circuitry which forms a part of the subject matter described and claimed in a copending patent application, Serial No. 120,213 filed on June 28, 1961 by Robert I. Roth and Harold Fleisher entitled "Associative Memory System" and assigned to the same assignee as the present application.

If all three words are rejected, the A pulse current continues on through the gate of cryotron 238–1 to energize an indicator 244. The indicator 244 will thus indicate that all words were rejected which means that the read out operation is completed. The indicator 244 may include latching apparatus to maintain the indicator in the "on" condition after the A pulse stops, but such latching apparatus is not shown. The indicator energizing circuit through the gate of cryotron 238–1 also includes the control winding of a cryotron 246 which forms a part of a control flip-flop. This flip-flop includes the control winding of a cryotron 248 in the same leg of the flip-flop and the gate of a cryotron 250 in the opposite leg. The gate of the cryotron 248 provides a circuit which carries the current from the B pulse output of the pulse generator 232 through a connection 252 which goes downwardly in the diagram to an OR circuit 254 which is connected to energize the stop signal input 236 to the pulse generator 232. Thus, whenever this control flip-flop including cryotron 246 is set by the indicator current, the cryotron 248 becomes conductive and the B pulse is supplied through the cryotron 248 to the OR circuit 254 to cause the pulse generator 232 to stop after the next succeeding C pulse. The passage of the B pulse current through the gate of cryotron 248 assumes the condition that all of the other possible paths for the B pulse are resistive. As will appear from the following description, this condition will exist whenever all of the words are rejected and the indicator current switches the cryotron 246. The control winding of cryotron 250 is included in the C pulse output circuit of the pulse generator 232 so that the control flip-flop is reset by the C pulse following the A pulse which caused it to be set through the control of cryotron 246. When the read out is completed, as detected by the operation of the indicator 244, it is clearly appropriate that the pulse generator 232 should be stopped by the B pulse supplied through cryotron 248 as just described.

In the operation of the A pulse circuitry including cryotrons such as 238–1 and 240–1, it was assumed that a cryotron shown at the first word level at 256 was resistive, and an associated cryotron 258 was conductive. This may be regarded as a normal mode of operation of the system in which read out of the entire contents of the memory are required and in which the first word level is to be written into in a normal manner and employed for word storage in the same manner as the other word positions. However, an important feature of the present invention resides in the ability of the system for an ordered read out of a sequence of words up to a previously specified limiting value in the ordering field. When this mode of operation is desired, the limiting value is stored in the first word position. This is done by simply storing the word containing the limiting value last. By means of control circuitry schematically illustrated by the double throw switch 260, a control current is shifted from the winding of cryotron 256 to the winding of cryotron 258. With this change in connections, it is apparent that whenever the condition is achieved that the lowest valued word in the memory is that word which is stored in the first word position, then the A pulse current which traverses the gate of cryotron 240–1 is diverted through the gate of cryotron 256 to the indicator 244 to indicate an end of the read out operation and to cause the pulse generator 232 to be stopped as previously described. If the limit operation is not required, then the switch 260 is kept in the upper position to maintain cryotron 256 resistive.

By a few simple changes in connections, the ordered read out circuitry may be arranged to commence the ordered read out with the highest valued word (rather than the lowest valued word) and to proceed to read out successively lower valued words until the entire memory has been read out. In such a modification, the limit circuitry associated with switch 260 is effective again to stop the successive read out operations when a particular limit value is reached. The limit value is then a low limit.

The pulse generator 232 may be initially started by energization of the start input connection 234. This is carried out through an AND circuit 262 which operates in response to a coincidence of signals from the OR circuit 34 and an input connection 266. The circuitry associated with connection 266 is provided merely for the purpose of indicating that the selection and rejection circuits are operative and that at least one word has been selected. The circuits associated with connection 266 may include the parallel connected cryotrons 268–1, 268–2, and 268–3, and the series connected cryotrons 270–1, 270–2, and 270–3. A current may be supplied continuously from a standard current source (not shown) through the input connection indicated at 272. If all words are rejected, then all of the parallel connected cryotrons 268–1, 268–2, and 268–3, will be resistive and there will be no input to the AND circuit 262 at 266. The current from 272 will instead traverse the cryotrons 270–1, 270–2, and 270–3 to energize an indicator 274. Indicator 274 will remain energized through the 270 cryotrons as long as all words remain rejected. However, whenever any one word is selected, the selection current at that level will make the 270 cryotron at that level resistive and the associated 268 cryotron at that level will become conductive so as to provide for a path for the current from 272, to the AND circuit 262. It is clear therefore that whenever any one or more words are selected, there will be an output 266 to the AND circuit 262.

Referring now to the control section of the system of FIG. 4 at the left of the figure, it is shown that the word selection and rejection circuits are provided with a continuous current through input connections 276–1, 276–2, and 276–3. These currents each may be provided from a conventional current source (not shown).

At the extreme left of the diagram there is a flip-flop for each word level for the purpose of indicating whether or not that word level is empty or full. These flip-flops are designated 277–1, 277–2, and 277–3. At the first word level, for instance, this flip-flop includes the control windings of cryotrons 278–1 and 280–1. If the word position is regarded as empty, there will be a current in the control winding of cryotron 280–1 to appropriately cause the 276–1 current to traverse the gate of cryotron 278–1 which constitutes the word rejection circuit line. This is generally appropriate for the read out operation of the system since a word obviously should not be read out from an empty word position. It will be appreciated that although a word may be considered as empty, the digit storage flip-flops such as 60A and 60B need not be reset to their binary zero conditions as long as this "word empty" flip-flop is set to the empty state. Immediately to the right of each of the word empty flip-flops, another flip-flop is shown at each word level which is for the purpose of indicating whether the word has previously been read out (even though it is not considered empty). These flip-flops are designated 281–1, 281–2, and 281–3. At the first word level, for instance, this flip-flop includes the control windings of cryotrons 282–1 and 284–1. After any word has been read out, this "read out flip-flop" is set to so indicate. And the setting of this flip-flop causes the current to traverse the control winding of cryotron 284–1 so that the current from 276–1 traverses the gate of cryotron 282–1 to cause the word to be suppressed in future word selection cycles. This is accomplished by the shift of current from the word selection line to the word rejection line through the cryotron 282–1. If the word has not yet been read out, then the read out flip-flop current will traverse the control winding of cryotron 282–1 so that the word selection current will remain in the select line through the gate of cryotron 284–1.

At each word level there is also provided a control flip-flop as indicated at 296–1, 296–2, and 296–3. The purpose of this control flip-flop is to detect and store the information that the particular associated word level is the one level which is operative during a particular cycle, and this stored information is employed for the purpose of changing the settings of the word empty flip-flops and the read out flip-flops as will be described below. The operation of these flip-flops and the associated apparatus will be explained with particular reference to the first word level. The flip-flop 296–1 includes the gate of the cryotron 298–1 in the right leg which has a control winding connected for energization from the read-out information transfer circuit including the gates of cryotrons 172A and 174A. Accordingly, if the first word level is the selected word level, the "A" pulse current which traverses the information transfer circuit for that word will set the control flip-flop through the cryotron 298–1.

The "B" pulse circuit from the pulse generator 232 includes a horizontal pulse supply line at each word level such as 300–1 at the first word level which is opened at the gate of a cryotron 308–1 if the flip-flop 296–1 has been set by the operation of cryotron 298–1. Conversely, if this particular word level has not been selected, the "B" pulse circuit supply line is blocked by the cryotron 308–1. The "B" pulse circuit supply line therefore continues to the left only at the one word level which is selected. Also, as previously mentioned, if no word is selected, then all of these 300 circuits are blocked and the B pulse current passes through cryotron 248 to be used to shut off the pulse generator 232.

The circuit of the line 300, through the gate of cryotron 308–1, provides a control through which the word level may be emptied as well as suppressed, or it may simply be suppressed by setting the read out flip-flop. These two methods of operation may be chosen by control circuits schematically illustrated by the double throw switch 316. If the word is simply to be read out and suppressed, then the switch is placed in the left hand position as shown to energize the control windings of cryotrons 318–1, 318–2, and 318–3. The "B" pulse current through the gate of cryotron 308–1 then traverses the gate of an associated cryotron 320–1 at the first word level to a connection 322–1. Form the connection 322–1 the current traverses the control winding of a cryotron 324–1 in the read out flip-flop to set that flip-flop to thereafter suppress the word.

On the other hand, if the circuit is operated for read out and empty, then, at the first word level, cryotron 320–1 is resistive and the "B" pulse current traverses the gate of cryotron 318–1 through a circuit including the control winding of a cryotron 325–1 to reset the word empty flip-flop to the empty condition. This control winding circuit then joins the connection 322–1 to also operate the read out flip-flop through cryotron 324–1 as described just above. At the second word level, the circuit including the gate of cryotron 318–2 includes the control winding of a cryotron 326–2 in an intermediate flip-flop 327–2. This circuit serves to set the flip-flop 327–2 for a purpose which will be explained more fully below. A similar cryotron 326–3 in a flip-flop 327–3 is shown at the third word level and connected in a similar manner.

The control winding circuits of the cryotrons 324–1, 324–2, and 324–3 join in a common circuit 328 which provides a read out sample pulse output. This sample pulse may be supplied to the apparatus which receives the data read out of the system on read out busses 198A and 198B for the purpose of indicating to that apparatus at what time the data should be recognized. Since the data is transferred from the data storage flip-flops to the read out busses at the "A" pulse time, the "B" pulse time is an appropriate time for the new data to be sampled or looked at by the receiving apparatus. The sample pulse output circuit is a closed loop in which the current returns on line 330 which provides a signal at 314 to the OR circuit 254 to stop the pulse generator 232.

In each cycle of operation of the system, immediately after the "B" pulse, a "C" pulse is suplied by the "C" pulse circuit of the pulse generator 232. The function provided by this circuit is to reset the control flip-flops 296–1, 296–2, and 296–3 by traversing the control windings of the associated cryotrons 342–1, 342–2, and 342–3. This circuit continues and forms the signal line 36 to the OR circuit 28, the operation of which will be described more fully below.

The read out flip-flops all may be simultaneously reset by reset circuitry schematically illustrated by a switch 344 through the energization of each of the control windings of reset cryotrons 346–1, 346–2, and 346–3 through a circuit including the control winding of a cryotron 345. The cryotron 345 serves to reset a flip-flop 347 for a purpose which will be described later. It is one of the interesting features of the invention that the contents of the memory may be read out in ordered sequence again and again by simply operating the reset control 344 before each read out squence is to be commenced. While not shown, similar reset circuitry may be provided to set all of the word empty flip-flops to the empty condition if it is desired to empty the entire memory.

Most of the parts of the system of FIG. 4 which have been described above form a portion of the subject matter described and claimed in the copending patent application Serial Number 176,958, now Patent No. 3,191,156 entitled "Random Memory With Ordered Read Out," filed by the same inventor on March 2, 1962, and assigned to the same assignee as the present application.

*Write operation of FIG. 4*

As mentioned previously in connection with FIG. 1, information is stored in the system by entry through the write in register 16. Each new word is thus stored in the first storage register 10 and all words previously stored are shifted downwardly until the uppermost vacant storage register is filled. The basic components of the write in register 16 are the storage flip-flops 66A and 66B. These flip-flops respectively include cryotrons 348A and 350A and cryotrons 348B and 350B having control windings arranged to receive the binary digits of the input data word. Similar flip-flops 68A and 68B and 70A and 70B are provided in the intermediate registers 20 and 22. Suitable information transfer and shift circuits are provided for moving the information downwardly from the flip-flops of the input register 16 to the flip-flops of the storage register 10 and from the flip-flops of the storage register 10 to the flip-flops of the intermediate register 20 and so on from each register to the next lower register. Suitable control pulses for this transfer of information are provided from a write pulse generator 352 in the write controls section 24 of the system.

In the section 24 there are also included intermediate flip-flops as shown at 327–2 and 327–3 for intermediate storage of the blank and not blank condition for the associated register. Similar intermediate flip-flops as indicated at 354–2 and 354–3 are provided for intermediate storage of the information normally stored in the 281 flip-flops as to whether or not particular words have been read out. Flip-flop 347 provides an initial input to this column of flip-flops. The 347 flip-flop is operated in conjunction with the write in register 16. The intermediate flip-flops 327–2 and 354–2 are operated in conjunction with the intermediate register 20 and the intermediate flip-flops 327–3 and 354–3 are operated in conjunction with intermediate register 22.

The system of FIG. 4 is capable of operating in a number of different modes. For the purpose of determining these modes, control circuits are provided which are schematically illustrated by double pole switches 356 and 358. The functions and operation of these switches will be described more fully below. The switch 356 controls the supply current from a standard current source indicated at 360 to either the control winding of a cryotron 362 or to the control winding of the cryotron 364. For the purpose of the present portion of the description, it is assumed that the switch 356 remains in the lower position as shown, to supply current to the control winding of cryotron 362. Thus, the current from the "S" output terminal of the pulse generator 352 is forced to travel through the gate of cryotron 364. Similarly, the switch 358 is assumed to remain in the lower position, as shown, to supply current from a standard source, indicated by an input connection 366, to the control windings of the lower set of cryotrons in the associated control circuits. These cryotrons are indicated at 368, 372, and 376. The opposing cryotrons are shown at 370, 374, and 378.

The pulse generator 352 may be of standard construction and accordingly the details of this generator are not shown. However, the pulse generator 352 is arranged to deliver a series of pulses on the output terminals lettered S, T, U, and V whenever a start signal is delivered to the pulse generator at the input connection 380 from the OR circuit 28. The series of pulses at the output terminals must appear in a sequence as shown in the pulse diagram immediately to the right of pulse generator 352. This series of pulses is emitted each time an input signal is provided at 380. The pulse diagram shows that the "U" pulse overlaps with the "T" pulse.

In the normal write operation, in which a single word is stored in the memory, the pulse generator 352 is started as by a start signal from switch 26 through OR circuit 28. The "S" pulse from generator 352 travels through the gate of cryotron 364 and follows a circuit 382 to test for a blank or not blank condition in the first word storage register 10 by testing flip-flop 277–1. This test is accomplished by means of the cryotrons 384–1 and 386–1. If the first word level is blank (empty), the current in the flip-flop 277–1 traverses the control winding of cryotron 384–1 and the "S" pulse current on line 382 therefore travels to ground through the gate of cryotron 386–1. However, if the first word level is not empty the "S" pulse continues through the gate of the cryotron 384–1 to shift information downwardly from the first storage register 10 into the intermediate register 20. First, however, the current is supplied to the control winding of a cryotron 388–2 to make sure that the intermediate flip-flop 327–2 is set to the "not blank" condition. The "S" pulse circuit then continues to the read out flip-flop 281–1 where it picks up information at the gate circuits of cryotrons 390–1 and 392–1. This information is transferred downwardly to flip-flop 354–2 by control of cryotrons 394–2 and 396–2. The "S" pulse circuit then continues to the register 10 flip-flop 60A where it transfers the binary information to intermediate register flip-flop 68A by means of the cryotrons 398A, 400A, 402A, and 404A. The "S" pulse then continues to flip-flop 60B where it transfers the information in a similar manner to intermediate flip-flop 68B.

The "S" pulse then continues downwardly to the "blank, not-blank" flip-flop 277–2 where it again tests for a blank condition of the second storage register 12 by means of the cryotrons 384–2 and 386–2. If this word level is blank, the "S" pulse is grounded through the gate of cryotron 386–2. However, if this word level is not blank, then the information is shifted downwardly in the same way as described above by a continuation of the "S" pulse through the gate of cryotron 384–2. This is accomplished by similar information transfer circuits for transferring information from storage register 12 to intermediate register 22 and including cryotrons 388–3, 390–2, 392–2, 394–3, 396–3, 406A to 412A, and 406B to 412B. From the preceding description, it is clear that the "S" pulse circuit through cryotron 364 tests all word levels starting from the top and working down until a blank level is found. At all of the levels which are not blank, the information is shifted from each storage register to the intermediate register immediately below it.

The next objective in the operation of the system is to shift the information stored in each intermediate register into the storage register immediately below it. This shift is to be accomplished at all levels at the same time. Furthermore, the new word contained in the input regitser 16 is likewise to be shifted into the first storage register 10 at the same time. However, the flip-flops of the storage registers are provided with writing circuits which include persistent current circuit loops, and these loops must be cleared before information can be transferred into any storage register.

The persistent current loops in the storage registers 10, 12, and 14 are shown for the high order column flip-flops at 414A, 416A, and 418A. The corresponding persistent current loops for the lower order column flip-flops 60B, 62B, and 64B are shown at 414B, 416B, and 418B. Whenever a "one" is stored in one of these flip-flops, a persistent current in the clockwise direction exists in the associated persistent current loop. Each of the persistent current loops includes the gate circuit of an associated cryotron. These cryotrons in the high order column are indicated at 420A, 422A, and 424A. Similar cryotrons are similarly identified in the B column with the suffix B. The persistent current loops are each reset by stopping the persistent current circulation by closing the gates of the last mentioned cryotrons. This is accomplished by the "T" pulse from pulse generator 352 which travels through connection 426 through the control windings of the persistent current circuit cryotrons in the following order: Cryotrons 420A, 420B, 422B, 422A, 424A, and 424B.

Next, the information is transferred by the "U" pulse from the pulse generator 352. The "U" pulse is first supplied through a connection 428 to the control winding of a cryotron 430–1 to assure that the blank flip-flop 277–1 is set to indicate "not-blank" for storage register 10. The "U" pulse circuit then continues through connection 431 to flip-flop 347 where it picks up the binary information stored therein by means of cryotrons 432–1 and 434–1 and transfers such information to the read out flip-flop 281–1 by controlling cryotrons 436–1 and 438–1. This transfers the proper information about read out with respect to the word to be stored in the first storage register 10. Generally, flip-flop 347 is set with the current in the left branch circuit including the control winding of cryotron 434–1 to indicate that the incoming word has not been read out. This is accomplished by a cryotron 439. The control winding of cryotron 439 is energized usually before the beginning of any write operation, or series of write operations, by means of an associated circuit schematically illustrated by the switch 440 shown in the drawing.

The "U" pulse circuit continues through connection 441 to the flip-flop 66A of input register 16 where the information stored in that flip-flop is detected by cryotrons 442A and 444A. If a zero is stored in the flip-flop 66A, then cryotron 442A will be resistive and the "U" pulse current will continue through the gate of cryotron 444A to connection 446. However, if a one is stored in flip-flop 66A then the "U" pulse current will travel through the gate of cryotron 442A to a connection 448A. Since the "T" pulse overlaps the "U" pulse, the cryotron 420A will be resistive at the time the "U" pulse current is set up. Therefore, the "U" pulse current at connection 448A is forced to travel around the persistent current loop 414A to the connection 450A where it joins the connection 446 to continue to flip-flop 66B. The "T" pulse current ends, and the cryotron 420A again becomes conductive, before the end of the "U" pulse current. However, as is characterized in cryogenic circuits, the "U" pulse current persists in traveling through the persistent current loop 414A rather than dividing through the gate of cryotron 420A. However, at the end of the "U" pulse, the current in the persistent current loop 414A persists and uses the non-resistive gate of cryotron 420A to complete its circulation path.

In the case where a zero is stored in flip-flop 66A, since the "U" pulse current continues directly through the gate of cryotron 444A to the connection 446, no current is provided to the persistent current loop 414A, and accordingly no persistent current remains in that loop after the termination of the "T" and "U" pulses. The persistent current loop 414A includes control windings of cryotrons 452A and 454A located respectively in the two legs of flip-flop 60A. The cryotron 454A is provided with an auxiliary winding 456A which is continuously supplied with a bias current which is in opposition to the current in the first control winding of loop 414A. Accordingly, the net effect of the presence of both currents in the respective control windings of cryotron 454A is essentially zero so that cryotron 454A is not substantially resistive in the presence of both currents. At the same time, the associated cryotron 452A is resistive in the presence of the current in the persistent current loop 414A, and accordingly the current of the flip-flop 60A travels through the gate of cryotron 454A instead of the gate cryotron 452A whenever the persistent current is present. In the absence of the persistent current in loop 414A, the bias current in winding 456A of cryotron 454A makes that cryotron resistive and the current of the flip-flop 60A accordingly travels through the gate of cryotron 452A to indicate the storage of a zero. Thus, it is to be seen that the absence of a persistent current in loop 414A corresponds to the storage of a binary zero in flip-flop 60A while the presence of such a current is associated with the storage of a one in that flip-flop.

The "U" pulse continues through the connection 446 to the flip-flop 66B where the information is transferred to the flip-flop 60B in a manner similar to that just described through components which are similarly lettered, but with the suffix B. The "U" pulse current then continues through a connection indicated at 458 to the intermediate flip-flop 327–2. At this flip-flop, the "blank, not-blank" information is transferred to flip-flop 277–2 by means of cryotrons 460–2, 462–2, 464–2, and 466–2. The "U" pulse current then continues through connection 468 to the intermediate read flip-flop 354–2 where it transfers binary information contained therein to the read flip-flop 281–2 by means of the cryotrons 432–2, 434–2, 436–2, and 438–2. The "U" pulse current then continues through connection 469 to the flip-flop 68A of intermediate register 20. At the flip-flop 68A, if a zero is stored, then a cryotron 470A is resistive and the "U" pulse current continues through the gate of an associated cryotron 472A to a connection 474 without setting up a circulating current in persistent current loop 416A of flip-flop 62A. However, if a one is stored in flip-flop 68A then the "U" pulse current travels through the gate of cryotron 470A and causes the setting up of a persistent current in loop 416A in the same manner as previously described in connection with the transfer of information from flip-flop 66A to flip-flop 60A. In this way, the cryotrons 476A and 478A are controlled by the persistent current in the loop 416A to cause the storage of a one in flip-flop 62A. In a similar manner, the "U" pulse current continues through connection 474, and through similar circuitry, transfers binary information from flip-flop 68B to flip-flop 62B and then continues through a connection 480 to flip-flop 327–3 where it transfers information to flip-flop 277–3; and on through connection 482 to transfer binary information from flip-flop 354–3 to flip-flop 281–3, and then on through connection 484 to flip-flop 70A where information is transferred by means of cryotrons 486A and 488A to the persistent current loop of 418A and the flip-flop 64A to control the cryotrons 490A and 492A. The circuit then continues through connection 494 to accomplish a similar transfer from flip-flop 70B to flip-flop 64B. Thus, the "U" pulse accomplishes a completion of the downward shift of words in the memory.

It is to be observed that the "S" pulse moves information downwardly from all of the uppermost occupied storage registers into the intermediate register immediately below each storage register. The "S" pulse does not move information downwardly from any blank storage register. After the resetting of the storage registers by the "T" pulse, the "U" pulse circuits provide for writing information from all of the intermediate registers into the respective storage registers immediately below them. The "U" pulse circuitry does not distinguish between words which have been shifted down and words which have not been shifted down. However, this does not lead to an inaccurate result because the intermediate registers which do not have new information shifted into them by the "S" pulse circuit will continue to store the information previously stored and previously contained in the associated storage register immediately below. Accordingly, the "U" pulse operation simply restores the same information in the storage register which was placed there on the previous storage cycle, if no shift-down into that storage register occurs.

*Self-rearrangement operation of FIG. 4*

One of the most interesting features of the present invention resides in its capability for automatic self-rearrangement so that the individual words which are stored are physically arranged in a sequence. Such a physical rearrangement is very useful for certain special purposes such as for matrix comparison operations between two or more of such memories. Also, after the rearrangement, conventional addressing of the various registers by physical position may be employed to find the word having, for instance, the third value or the fifth value in the sequence.

For the automatic rearrangement operation, the control switch 358 shown in the upper portion of the control section 24 is shifted to the upper position to energize the control windings of cryotrons 370, 374, and 378. The operation is then commenced by starting the read out pulse generator 232 by means of the start switch 32. The read out sequence then begins with the "A" pulse from pulse generator 232. The "A" pulse circuitry operates as previously described at a selected word level. For instance, the word level represented by storage register 12 may be selected, and the word is therefore transferred from the flip-flops 62A and 62B to the read out busses 198A and 198B. This is accomplished though the 176A, 178A, 176B, and 178B cryotrons, and the 188A, 190A, 188B, and 190B cryotrons. The "A" pulse then continues through the winding of cryotron 298–2 to set the 296–2 flip-flop to indicate that the word storage register 12 has been read. The "A" pulse current then continues from cryotron 298–2 to a common connection indicated at 496. Since the 496 connection receives the "A" pulse current from each of the 298–1, 298–2, and 298–3 cryotrons, the "A" pulse always reaches the common connection 496 whenever a word is read out. The "A" pulse current then travels upwardly in the diagram to the cryotrons 376 and 378. When the system is in the normal reading mode of operation, cryotron 376 is resistive and this circuit is therefore grounded through the gate of cryotron 378. However, when the system is in the rearrange mode of operation, the "A" pulse continues on through the gate of cryotron 376 through the control winding of a cryotron 498 in the 347 flip-flop. This assures that flip-flop 347 is set to the condition indicating that the word to be placed in the first storage register 10 has been read out and rearranged. This nullifies any prior reset of flip-flop 347 such as by the operation of cryotron 439. The "A" pulse circuit continues on to the input register 16 where it transfers information from the read out bus 198A to the flip-flop 66A by means of an information transfer loop including cryotrons 500A, 502A, 504A, 506A. A similar information transfer is made also from the read out bus 198 B to the flip-flop 66B by means of the second information transfer loop including the cryotrons 500B through 506B. Thus, the word which is read out is immediately stored in the input register 16 during the "A" pulse period of the read out cycle.

The "B" and "C" pulse circuitry operates exactly as previously described for the read out operation. However, the "C" pulse, when it appears on connection 36, is transmitted through the gate of cryotron 368 to the OR circuit 28 to start the write pulse generator 352. Thus, when there is a successful read out cycle in the rearrange mode of operation, the write pulse generator 352 is started at the end of the read operation. The writing and push-down storage cycle then proceeds exactly as previously described above, resulting in a shifting down of all of the uppermost words and the restorage in the storage register 10 of the word which was read out and stored in the input register 16. However, the "V" pulse from the write pulse generator 352, which was previously connected to ground through the gate of cryotron 374, is now caused to continue through the gate of cryotron 372 to a circuit 510. Circuit 510 is connected back to the OR circuit 34 to restart the read out pulse generator 232 to commence a new cycle in the word rearrangement operation. However, if all of the words have been read out and rearranged, the read out pulse generator will not be restarted because the AND circuit 262 will not be energized from its connection 266. This results from the fact that all of the 281 flip-flops will be set with the result that all of the 268 cryotrons will be blocked and the current from 272 will be delivered through the 270 cryotrons to the indicator 274. Thus, when the rearrangement is completed, the operation will stop and the completion will be indicated at 274.

*Parallel write operation of FIG. 4*

Another interesting mode of operation which is possible with the system of the present invention is that information words may be stored in all of the storage registers in one write cycle. For this purpose, the individual characters of the words to be stored are supplied at the input register 16 and the intermediate registers 20 and 22. This information is supplied at the input register 16 to the individual flip-flops 66A and 66B through the control windings of cryotrons 348A, 350A, 348B, and 350B. Similar information input circuits are provided in the intermediate register 20 at the flip-flops 68A and 68B by means of cryotrons indicated at 512A, 514A, 512B, and 514B. Similar input circuits are also provided for the intermediate register 22 at flip-flops 70A and 70B by means of cryotrons indicated at 516A, 518A, 516B, and 518B.

The control switch 356 at the write pulse generator 352 is moved to its upper position to energize the control winding of cryotron 364 and to de-energize the cryotron 362. The write pulse generator 352 is then started by operation of the shaft switch 26. The "S" pulse is then transmitted through the gate of cryotron 362 to a series circuit which provides for a resetting of all of the read out flip-flops and the blank and not blank register flip-flops. This is accomplished by the series circuit which traverses the control windings of the following cryotrons in the following flip-flops: Cryotron 520–1 in flip-flop 347, cryotron 522 in flip-flop 277–1, cryotron 524–2 in flip-flop 327–2, cryotron 520–2 in flip-flop 354–2, cryotron 520–3 in flip-flop 354–3, and cryotron 524–3 in flip-flop 327–3. The remainder of the operation of the write pulse circuits proceeds as previously described for the write operation. The operation of the write pulse generator and the associated circuitry causes the new information appearing at the input register 16 and the intermediate registers 20 and 22 to be stored in each of the associated storage registers. Incidental to this storage operation, the 281 read out flip-flops are reset by the shift of information from the associated 347 and 354 flip-flops which themselves were reset by the "S" pulse circuit through cryotron 362. Similarly, the 277–2 and 277–3 "blank, not-blank" flip-flops are reset by the transfer of the "not-blank" information from the associated 327 flip-flops which were also reset by the "S" pulse circuit. If it is desired that some word positions are to be filled and others are to be left vacant in the parallel read in operation, the information read in circuits to the input and intermediate registers may be modified to include individual word by word blank and not-blank input signals to the 327 flip-flops, rather than resetting all of these flip-flops with the "S" pulse circuit.

If desired, individual word storage registers within the memory may be selectively and individually emptied by simply resetting the associated "blank, not-blank" 277 flip-flop to the blank condition. In the case of flip-flops 277–2 and 277–3 it is also necessary to reset the associated intermediate flip-flops 327–2 and 327–3. Reset circuits for this purpose are schematically illustrated by the switches shown at 550–1, 550–2, and 550–3. The 550–1 switch supplies a current to a reset cryotron 552–1 in the 277–1 flip-flop. The 550–2 switch is connected to supply a control current to a reset cryotron 554–2 in the 327–2 flip-flop and to a reset cryotron 552–2 in the 277–2 flip-flop. Similarly the 550–3 switch provides a circuit controlling reset cryotrons 554–3 and 552–3.

*Associative read out operation of FIG. 4*

Another interesting feature of the system of the present invention is that it may be operated as an associative memory as well as a sequential read out memory, or as a combination of the two. For the purpose of shifting to the associative mode of operation, control circuitry as schematically shown by the double throw switch 530 is provided at the top of the diagram. This switch supplies a current from a standard current source indicated by the input terminal associated therewith to either an upper control circuit including the control windings of cryotrons 534A and 534B, or to a lower control circuit including the control windings of cryotrons 536A and 536B. With the switch 530 in the upper position as shown, current is provided through the gates of the cryotrons 536A and 536B to the all ones detection circuits 144A and 144B as previously described in connection with the sequential read out operation of the system. However, if associative selection and read out is desired, the switch 530 is changed to its lower position and the crurent is then provided instead through the gates of each of the cryotrons 534A and 534B directly to the circuits 152A and 152B so that the all ones detection circuits are immediately made incapable of detecting the all ones condition. In other words, the comparison circuitry will always reject ones and select zeros at each digit position of the associated column.

Associative digital information is provided from an association register 537 which stores a desired association word. The association digit information from the association register 537 is provided at the high order column from a connection 538A. A current is supplied at the connection 538A if the association digit is a "one" for this particular column of the memory. This association circuit 538A includes auxiliary windings of the cryotrons 452A and 454A in the 60A flip-flop. As indicated in the drawing, the association circuit current in the auxiliary winding of a cryotron 454A is in the same direction as the current in the other control winding of this cryotron which forms a part of the persistent current loop 414A. However, in the cryotron 452A, the association circuit control winding current is in opposition to the control winding current of the persistent current loop 414A. Accordingly, if a "one" is stored in flip-flop 60A, with the accompanying existence of the current in the persistent current loop 414A, then the net effect is to make the 452A cryotron conductive and the 454A cryotron resistive as long as the association current exists. Thus, the main current in the flip-flop 60A is shifted to the right circuit leg of that flip-flop to indicate a zero rather than a one. In this way, a "one" current signal on the associative signal line 538A complements the flip-flop 60A to a zero if it stores a one. On the other hand, if the flip-flop 60A stores a "zero," then the association current on connection 538A causes the temporary complementing of the flip-flop 60A to a "one." This is accomplished as folllows: The current through the auxiliary complement winding of cryotron 454A bucks the bias winding 456A, and in the absence of the persistent current in loop 414A, this cryotron 454A becomes conductive. The complement current from the 538A circuit which traverses the auxiliary winding of cryotron 452A makes that cryotron resistive in the absence of the opposing current in the persistent current loop 414A. Accordingly, the current in flip-flop 60A is caused to shift from the "zero" leg through cryotron 452A to the "one" leg through cryotron 454A. Thus, the associative "one" signal causes a complementing of each digit in the high order column storage register flip-flops. Similar complement circuitry for association is provided in the lower order column as well.

If any word stored in the memory exactly matches the association word, then the resultant complementation of all of the corresponding "ones" to "zeros" coupled with the fact that there is no complementation for columns where the association register digit is a "zero" produces the result that the word position which exactly associates with the input association information will register all zeros. The sequence word selection circuitry is then employed as described above to choose or select this association word on the basis that it is indeed the word having the lowest value. Since the "all ones" detection circuits are disabled through the control exercised by the switch 530 and the cryotrons 536A and 536B, no word can be selected unless it does register all zeros. Accordingly, the system will not select any word unless it is an exact associative match.

It will be understood that the association selection may be applied, as desired, to only certain selected columns of the memory while the remainder of the word may be selected on the basis of ordered sequence as previously described. Words are then selected on the combination basis that they first pass the association test in the field in which that test is applied and then from the class of words passing the test, the word having the lowest value in the ordering field is selected. The field devoted to the associative selection is a high order field so that first eliminations can be made on an associative basis.

*Other features of FIG. 4*

The system of the present invention may be very usefully employed for purposes such as a queuing memory for a large computing system in which certain words are selected on an associative basis and also on the basis of some other tests, such as priority. The priority information is stored in the form of a priority number, the lowest number in the priority field signifying the highest or first priority. The present system is also very useful in such an application because the word which has been longest in memory, and which meets the other tests, is always the first word to be read out. This is inherent in the operation of the read out "A" pulse circuitry including the 238 and 240 cryotrons. As explained above, the lowermost word which meets the selection test will always be the word actually selected.

It will be apparent, however, that the system may be modified, if desired, to provide that the newest word (or the word most recently written into the memory) which meets the other tests will be the first to be selected and read out. This modification may be made by arranging the circuit to send the "A" pulse in at the top of the system rather than at the bottom.

Another interesting feature of the FIG. 4 embodiment of the invention, when used as a queuing memory with a priority field, is that a priority override feature is obtainable. For instance, an individual column in the priority field is assigned to each priority class and a "one" digit stored only in the appropriate column at each word level signifies that priority for that word. All of the words in a particular priority class may be given an override priority which precedes all other priority classes by simply complementing all of the flip-flops in the entire column assigned to that priority class. The priority field for each word in that clas will then display all zeros, which will automatically give that class of words the highest priority. This complementing may be accomplished by the complement circuitry previously described in connection with the association register 537. A complement signal may be supplied to the desired column by providing the signal from the appropriate complement circuit from the association register. The priority fields of all words in the other priority classes will continue to contain a "one" digit in each of their assigned columns, and each will contain a "one" digit also in the complemented column. Thus, the relative priorities of all of the words in the other priority classes will remain the same. As long as the complement circuitry is effective, this priority override feature will be effective with respect to all of the words contained in the memory, including new words entered after the first initiation of the priority override operation. If circumstances change so that the priority override for the selected priority class is no longer required, the complement signal may be removed and thus the original priorities are re-established.

The ordered read out features of this invention have been explained in terms of reading the contents of the memory out in an ordered sequence proceeding from the word storing the lowest to the word storing the highest value in the ordering field. It is obvious that with only minor changes in the word selection circuitry, the system may be adapted to select the words in an order proceeding from the highest to the lowest value stored in the ordering field. However, another unusual and interesting feature is that the system may be shifted from low word read out selection to high word read out selection by simply complementing all of the storage register flip-flops in the ordering field by use of the complementing circuitry associated with the association register 537. In other words, "ones" are set in the association register for each digit corresponding to each column of the ordering field. The ordering circuits then select words for readout on the basis of the complemented digit values. The system may be shifted back to low word selection at will by simply turning off the complement circuits.

The explanations of the ordered read out selection portions of this system have been based upon a straight "binary" number storage system. However, it is quite apparent that the system will work equally as well for most of the other commonly used machine number storage codes such as "binary coded decimal," "biquinary," etc., so long as each bit column having a higher weighted value is placed to the left of those having lower weighted values.

A number of separate continuous current input circuits are identified in the system of FIG. 4. It will be understood that because of the nature of cryogenic circuits, a number of these continuous current circuits may be advantageously combined in series connected groups and supplied by a single current source for each group.

From the above explanations it is believed to be quite clear that the present system fulfills all of the objectives of the invention.

While the invention has been particularly shown and described with reference to a preferred embodiment, it will be understood by those skilled in the art that various changes in form and details may be made therein without departing from the spirit and scope of the invention.

What is claimed is:

1. A push-down memory system for binary information which provides an ordered read out of words in sequence proceeding from one extreme value to the other comprising:

(a) a plurality of word storage registers each forming an individual word position storage row in the memory, (b) means for entering each word to be stored into the upper end storage register of said memory, (c) means interconnecting said word storage registers and operable during the entry of a new word to shift all words stored in storage registers above the uppermost empty word storage register so that each such shifted word will occupy the next lower storage register to make room for said new word in said end storage register, (d) a condition detection means for each digit in each register, (e) each of said condition detection means being active in the presence of an input signal for indicating first and second conditions of the associated digit, (f) one of said conditions being the "zero" condition and the other being the "one" condition, (g) means for providing an input signal to each of said condition detection means for the highest order column for all word storage registers from which words are to be read out, (h) each of said condition detection means being operable when active to provide an output signal in response to said first condition and to provide an alternative output signal in the presence of the second condition at all of the active condition detection means for the associated column, (j) each condition detection means being connected to provide either of the output signals therefrom as an input signal to any lower order condition detection means for the same storage register, (k) and an output signal from any condition detection means of the lowest order constituting a word selection control signal indicating an extreme value word selected to be read out, (l) a read out means operable to read out the word from a single selected register, (m) and means thereafter operable to make the condition detection means for that word storage register inactive by suppressing the input signal thereto.

2. A push-down memory system for binary information which provides an ordered read out of words in sequence proceeding from one extreme value to the other comprising:

(a) a plurality of word storage registers each forming an individual word position storage row in the memory, (b) means for entering each word to be stored into the upper end storage register of said memory, (c) means interconnecting said word storage registers and operable during the entry of a new word to shift words previously stored in storage registers above the uppermost empty word storage register so that each such shifted word will occupy the next lower storage register to make room for said new word in said end storage register, (d) an individual ordering control circuit for each storage register, (e) means for providing an input signal to each of said ordering control circuits for all storage registers from which words are to be read out, (f) each of said ordering control circuits comprising a condition detection means for each digit in the register, (g) each of said condition detection means being active in the presence of an input signal thereto for indicating first and second conditions of the associated digit, (h) one of said conditions being the "zero" condition and the other being the "one" condition, (j) each of said condition detection means for the highest order column being connected to receive said input signals to the associated order control circuits, (k) each of said condition detection means being operable when active to provide an output signal in response to said first condition, (l) an "all second condition" detection means for each column which is operable in response to the second condition at all of the active condition detection means for that column, (m) each of said active condition detection means being connected to provide an output signal in response to said second condition in the presence of the concurrent operation of the associated "all second condition" detection means, (n) each condition detection means being connected to provide the output signal therefrom as an input signal to any lower order condition detection means of the associated order control circuit, (o) and the output signal from each condition detection means of the lowest order constituting the output for the associated ordering control circuit indicating an extreme value word selected to be read out, (p) a read out means operable to read out a single selected word, (q) and means thereafter operable to make that word storage position inactive by suppressing the operation of said input signal means with respect to the associated ordering control circuit.

3. A push-down memory system for providing automatic ordered read out of words in a sequence proceeding from one extreme value to the other comprising:

(a) a plurality of binary storage flip-flops arranged in rows forming storage registers for the storage of individual words and having corresponding word flip-flops arranged in columns, (b) circuit means for entering each word to be stored into the upper end storage register of said memory system, (c) circuit means interconnecting said word storage registers and operable during the entry of a new word to shift words previously stored in storage registers above the uppermost empty word storage register so that each such shifted word will occupy the next lower storage register to make room for said new word in said end storage register, (d) a word selection circuit comprising an individual ordering control circuit for each storage register, (e) a word rejection circuit for each register, (f) an input circuit for each register connected to supply a current to said word selection circuit and connected to switch said current to said rejection circuit when said word is suppressed, (g) each of said ordering control circuits comprising a plurality of flip-flop condition detection circuits connected in cascade from the highest to the lowest order digit positions, (1) each of said condition detection circuits having an input connection and two output connections gated by the associated flip-flop for respectively indicating first and second conditions, (2) one of said conditions being the "zero" condition and the other being the "one" condition, (3) the first of said condition output connections being connected to provide the input signal to any lower order condition detection circuit of the associated order control circuit, (4) and said first condition output connection of the lowest order condition detection circuit comprising the ordering control circuit output indicating the extreme value word to be read out next, (5) the second of said condition output connections being normally connected to carry said word selection circuit current to said rejection circuit, (h) an "all second condition" detection circuit for each column arranged to indicate the second condition at all of the active current carrying condition detection circuits for that column and including a series of OR circuits connected to respond to any one of the first condition outputs from said condition detection circuits for that column for suppressing the operation of said "all second condition" detection circuit, (j) a coincidence circuit for each condition detection circuit connected to receive the "all second condition" signal from the "all second condition" detection circuit of the associated column and operable in response thereto to switch the current in each active second condition output connection from said rejection circuit to said word selection circuit, (k) and apparatus responsive to a combination of a word selection output from any said ordering control circuit and word rejection outputs from rejection circuits at other word levels for reading out the selected word and for then suppressing the word by switching the associated input circuit to supply the input current to the associated rejection circuit.

4. A memory system for providing automatic ordered read out of words within a predetermined class in a sequence proceeding from one extreme value to the other comprising:

(a) a plurality of binary storage flip-flops arranged in storage registers for the storage of individual words and having corresponding word flip-flops arranged in columns, (b) an individual ordering control circuit for each storage register, (1) each of said ordering control circuits comprising a flip-flop condition detection circuit for each flip-flop in the associated register connected in cascade from the highest to the lowest order digit positions, (i) each of said condition detection circuits having an input connection and two output connections gated by the associated flip-flop for respectively indicating first and second conditions, (ii) one of said conditions being the "zero" condition and the other being the "one" condition, (iii) the first of said condition output connections being connected to provide the input signal to any lower order condition detection circuit of the associated order control circuit, (iv) and said first condition output connection of the lowest order condition detection circuit comprising the ordering control circuit output indicating the selection of the word to be read out, (c) an "all second condition" detection circuit for each column arranged to indicate the second condition at all of the active condition detection circuits for that column, (1) and connected by means of a series of OR circuits to respond to any one of the first condition outputs from said condition detection circuits for that column for suppressing the operation of said "all second condition" detection circuit, (d) a coincidence circuit for each condition detection circuit connected to receive the second condition output signal therefrom, (1) all of said coincidence circuits being connected to receive the "all second condition" detection signal from the "all second condition" detection circuit of the associated column, (2) each coincidence circuit being operable to provide an output only in response to the concurrent presence of both of said signals, (3) the output of each said coincidence circuit being connected to supply a signal as an alternative to the first condition output of the associated condition detection circuit, (e) an individual word selection input circuit for each of said ordering control circuits, (f) and apparatus responsive to word selection outputs from said ordering control circuits for reading out only one selected word and for then disabling the associated word selection input circuit, (g) the flip-flops within at least one field of each of said registers each being provided with a complement control circuit connected and arranged to temporarily complement the flip-flop in response to a current therein, (h) all of said complement control circuits for the flip-flops in a particular column being connected for energization from a common signal, (j) an association register connected and arranged to provide a signal for each of said common column complement control circuits whenever a binary one digit is stored in the associated bit position of said association register, (k) and means for disabling said all second condition detection circuits for each column within said association field.

5. A memory system for providing automatic ordered read out of words in a sequence proceeding from one extreme value to a limit value comprising:

(a) a plurality of binary storage flip-flops arranged in rows forming storage registers for the storage of individual words and having corresponding word flip-flops arranged in columns, (b) circuit means for entering each word to be stored into the upper end storage register of said memory system, (c) circuit means interconnecting said word storage registers and operable during the entry of a new word to shift words previously stored in storage registers above the uppermost empty word storage register so that each such shifted word will occupy the next lower storage register to make room for said new word in said end storage register, (d) said end storage register comprising a limit value register for storing a limit value beyond which the sequence of read out is to be stopped, (e) an individual ordering control circuit for each register, (1) each of said ordering control circuits comprising a plurality of flip-flop condition detection circuits connected in cascade from the highest to the lowest order digit positions, (i) each of said condition detection circuits having an input connection and two output connections gated by the associated flip-flop for respectively indicating first and second conditions, (ii) one of said conditions being the "zero" condition and the other being the "one" condition, (iii) the first of said condition output connections being connected to provide the input signal to any lower order condition detection circuit of the associated order control circuit, (iv) and said first condition output connection of the lowest order condition detection circuit comprising the ordering control circuit output indicating the extreme value word to be read out next, (f) an "all second condition" detection circuit for each column arranged to indicate the second condition at all of the active condition detection circuits for that column and connected by means of a series of OR circuits to respond to any one of the first condition outputs from said condition detection circuits for that column for suppressing the operation of said "all second condition" detection circuit, (g) a coincidence circuit for each condition detection circuit connected to receive the second condition output signal therefrom, (1) all of said coincidence circuits being connected to receive the "all second condition" detection signal from the "all second condition" detection circuit of the associated column, (2) each coincidence circuit being operable to provide an output only in response to the concurrent presence of both of said signals, (3) the output of each said coincidence circuit being connected to supply a signal as an alternative to the first condition output of the associated condition detection circuit, (h) an individual word selection input circuit for each of said ordering control circuits, (j) read out apparatus for reading out a selected word and for then disabling the associated word selection input circuit, (1) said read out apparatus being operable to read out selected words in response to word selection outputs from said ordering control circuits proceeding from the selected word most distant from said limit value register, (k) and a stop circuit connected to said read out apparatus and connected for response to the word selection output from said limit value register for stopping the ordered read out sequence operation when the limit value register contains the only selected word.

6. A push-down memory system for binary information which provides for self-rearrangement of words in sequence proceeding from one extreme value to the other comprising:

(a) a plurality of word storage registers each forming an individual word position storage row in the memory, (b) means for entering each word to be stored into the upper end storage register of said memory, (c) means interconnecting said word storage registers and operable during the entry of a new word to shift all words stored in storage registers above the uppermost empty word storage register so that each such shifted word will occupy the next lower storage register to make room for said new word in said end storage register, (d) a condition detection means for each digit in each register, (e) each of said condition detection means being active in the presence of an input signal for indicating first and second conditions of the associated digit, (f) one of said conditions being the "zero" condition and the other being the "one" condition, (g) means for providing an input signal to each of said condition detection means for the highest order column for all word storage registers from which words are to be read out, (h) each of said condition detection means being operable when active to provide an output signal in response to said first condition and to provide an alternative output signal in the presence of the second condition at all of the active condition detection means for the associated column, (j) each condition detection means being connected to provide either of the output signals therefrom as an input signal to any lower order condition detection means for the same storage register, (k) and an output signal from any condition detection means of the lowest order constituting a word selection control signal indicating an extreme value word selected to be read out, (l) a read out means operable to read out the word from a single selected register, (m) means thereafter operable to cause that word storage register to be indicated as empty by suppressing the input signal to the associated condition detection means, (n) and means for conveying the word which is read out to said word entering means to restore said word into the upper end storage register of said memory to thereby establish the sequential rearrangement of words.

7. A cryogenic memory system including apparatus for providing automatic ordered read out of words in a sequence proceeding from the lowest to the highest value comprising:

(a) a plurality of cryogenic binary storage flip-flops each consisting of two cryotron gated alternate branch circuits for single currents arranged in rows forming registers for the storage of individual words and having corresponding word flip-flops arranged in columns, (b) write-in circuits including a write-in register for temporary initial storage of each new word and transfer circuits for shifting the new word from said write-in register to the upper end storage register of said memory, (c) shifting circuit apparatus operable during the entry of a new word to shift words previously stored in storage registers above the uppermost empty word storage register so that each shifted word will occupy the next lower storage register to make room for said new word, (d) said shifting circuit apparatus including intermediate registers connected and arranged between said storage registers for intermediate storage of each word which is shifted downwardly, (e) an individual ordering control circuit for each register, (1) each of said ordering control circuits comprising a plurality of flip-flop condition detection circuits connected in cascade from the highest to the lowest order digit positions, (i) each of said condition detection circuits having an input connection and two output connections gated by cryotrons having control windings connected respectively in the branch circuits of the associated flip-flop for respectively indicating the "zero" condition and the "one" condition, (ii) said zero condition output connection being connected to provide the input signal to any lower order condition detection circuit of the associated order control circuit, (iii) and said zero condition output connection of the lowest order condition detection circuit comprising the ordering control circuit output indicating the lowest value word to be read out next, (f) an "all ones" detection circuit for each column arranged to indicate the ones condition at all of the active condition detection circuits for that column comprising cryotrons at each word level having gate circuits connected in series and having control windings respectively connected in said zero condition connections to respond to any one of the zero condition outputs from said condition detection circuits for that column for suppressing the operation of said "all ones" detection circuit, (g) a coincidence circuit for each condition detection circuit comprising a cryotron having a gate circuit connected to receive the one output signal therefrom, (1) all of said coincidence circuit cryotrons having control windings connected to receive the signal from the "all ones" detection circuit of the associated column, (2) each coincidence circuit being operable in response to the concurrent presence of both of said signals to cause the one output signal to be shifted to supply a signal as an alternative to the zero condition output of the associated condition detection circuit, (h) an individual word selection input circuit for each of said ordering control circuits, (j) and apparatus responsive to word selection outputs from said ordering control circuits for reading out the single selected word which is stored in the selected register most distant from said end storage register and for then disabling the associated word selection input circuit.

8. A cryogenic memory system including apparatus for providing ordered read out of words comprising:

(a) a plurality of cryogenic binary storage flip-flops each consisting of two cryotron gated alternate branch circuits for a single current and arranged in rows forming registers for the storage of individual words and having corresponding word flip-flops arranged in columns, (b) write-in circuits for entering each word to be stored in the memory into the upper end storage register thereof, (c) said write-in circuits including a write-in register for temporary initial storage of each new word and transfer circuits for shifting the new word from said write-in register to said end storage register, (d) shifting circuit apparatus operable during the entry of a new word to shift words previously stored in storage registers above the uppermost empty word storage register so that each shifted word will occupy the next lower storage register to make room for said new word, (e) said shifting circuit apparatus including intermediate registers connected and arranged between said storage registers for intermediate storage of each word which is shifted downwardly, (f) shift control apparatus connected to all of said registers and operable to find the uppermost empty word storage register and to control said storage registers and said intermediate registers for each word to be shifted to provide for the downward shift to the intermediate register and then to the next lower storage register, (g) an individual ordering control circuit for each storage register, (1) each of said ordering control circuits comprising a flip-flop condition detection circuit for each flip-flop of said storage register, (i) said condition detection circuits being connected in cascade from the highest to the lowest order digit positions, (ii) each of said condition detection circuits having an input connection and two output connections gated by cryotrons having control windings connected respectively in the branch circuits of the associated flip-flop for respectively indicating first and second conditions, (iii) one of said conditions being the "zero" condition and the other being the "one" condition, (iv) the first of said condition output connections being connected to provide the input signal to any lower order condition detection circuit of the associated order control circuit, (h) an "all second condition" detection circuit for each column connected to respond to outputs from all of the active condition detection circuits for that column and including series connected cryotrons responsive to said first condition outputs and parallel connected cryotrons responsive to said second condition outputs for indicating when all of said active condition detection circuits are in said second condition, (j) a coincidence circuit for each condition detection circuit connected to receive the second condition output signal therefrom, (1) all of said coincidence circuits comprising cryotrons having control windings connected to receive the "all second condition" detection signal from the "all second condition" detection circuit of the associated column, (2) each coincidence circuit being operable to provide an output only in response to the concurrent presence of both of said signals, (3) and the output of each said coincidence circuit being connected to supply a signal as an alternative to the first condition output of the associated condition detection circuit.

9. A push-down memory system comprising:

(a) a plurality of binary storage flip-flops arranged in rows forming storage registers for the storage of individual words and having corresponding word flip-flops arranged in columns, (b) circuit means for entering each word to be stored into the upper end storage register of said memory system, (c) circuit means interconnecting said word storage registers and operable during the entry of a new word to shift words previously stored in storage registers above the uppermost empty word storage register so that each such shifted word will occupy the next lower storage register to make room for said new word in said end storage register, (d) a word selection circuit comprising an individual ordering control circuit for each storage register, (e) a word rejection circuit for each register, (f) an input circuit for each register connected to supply a current to said word selection circuit and connected to switch said current to said rejection circuit when said word is suppressed, (g) each of said ordering control circuits comprising a plurality of flip-flop condition detection circuits connected in cascade from the highest to the lowest order digit positions, (1) each of said condition detection circuits having an input connection and two output connections gated by the associated flip-flop for respectively indicating first and second conditions, (2) one of said conditions being the "zero" condition and the other being the "one" condition, (3) the first of said condition output connections being connected to provide the input signal to any lower order condition detection circuit of the associated order control circuit, (4) and said first condition output connection of the lowest order condition detection circuit comprising the ordering control circuit output indicating the extreme value word to be read out next, (5) the second of said condition output connections being normally connected to carry said word selection circuit current to said rejection circuit.

(h) an "all second condition" detection circuit for each column arranged to indicate the second condition at all of the active current carrying condition detection circuits for that column and including a series of OR circuits connected to respond to any one of the first condition outputs from said condition detection circuits for that column for suppressing the operation of said "all second condition" detection circuit, (j) a coindence circuit for each condition detection circuit connected to receive the "all second condition" signal from the "all second condition" detection circuit of the associated column and operable in response thereto to switch the current in each active second condition output connection from said rejection circuit to said word selection circuit, (k) apparatus responsive to a combination of a word selection output from any said ordering control circuit and word rejection outputs from rejection circuits at other word levels for reading out the word from the selected register and for then suppressing that register by switching the associated input circuit to supply the input current to the associated rejection circuit, (l) and means interconnecting said circuit means for entering each word to be stored and said read out apparatus for recirculating each word which is read out to re-enter said word into the upper end storage register to thereby physically rearrange the words in memory in sequence.

10. A push-down memory system for binary information which provides an ordered read out of words which pass an association test in sequence proceeding from one extreme value to the other comprising:

(a) a plurality of digit storage flip-flops arranged to form word storage registers, (b) means for entering each word to be stored into the upper end storage register of said memory, (c) means interconnecting said word storage registers and operable during the entry of a new word to shift all words stored in storage registers above the uppermost empty word storage register so that each such shifted word will occupy the next lower storage register to make room for said new word in said end storage register, (d) a condition detection means for each flip-flop in each register, (e) each of said condition detection means being active in the presence of an input signal for indicating first and second conditions of the associated flip-flop, (f) one of said conditions being the "zero" condition and the other being the "one" condition, (g) means for providing an input signal to each of said condition detection means for the highest order column for all word storage registers from which words are to be read out, (h) each of said condition detection means being operable when active to provide an output signal in response to said first condition and to provide an alternative output signal in the presence of the second condition at all of the active condition detection means for the associated column, (j) each condition detection means being connected to provide either of the output signals therefrom as an input signal to any lower order condition detection means for the same storage register, (k) and an output signal from any condition detection means of the lowest order constituting a word selection control signal indicating an extreme value word selected to be read out, (l) a read out means operable to read out the word from the single selected register positioned farthest from said end storage register, (m) means thereafter operable to make the condition detection means for that word storage register inactive by suppressing the input signal thereto, (n) each of the flip-flops within at least one field of each of said registers being provided with a complement control connected and arranged to temporarily complement the flip-flop in response to a signal thereto, (p) all of said complement controls for the flip-flops in a particular column being connected for energization from a common signal, (q) an association register connected and arranged to provide a signal for each of said common column complement controls whenever a binary one digit is stored in the associated bit position of said association register, (r) and means for disabling said "all second condition" detection circuits for each column within said association field.

11. A cryogenic memory system for providing automatic ordered read out of words in a sequence proceeding from one extreme value to the other comprising:

(a) a plurality of cryogenic binary storage flip-flops each consisting of two cryotron gated alternate branch circuits for single currents arranged in rows forming registers for the storage of individual words and having corresponding word flip-flops arranged in columns, (b) write-in circuits including a write-in register for temporary initial storage of each new word and transfer circuits for shifting the new word from said write-in register to the upper end storage register of said memory, (c) shifting circuit apparatus operable during the entry of a new word to shift words previously stored in storage registers above the uppermost empty word storage register so that each shifted word will occupy the next lower storage register to make room for said new word, (d) said shifting circuit apparatus including intermediate registers connected and arranged between said storage registers for intermediate storage of each word which is shifted downwardly, (e) a word selection circuit comprising an individual ordering control circuit for each storage register, (f) a word rejection circuit for each register, (g) an input circuit for each register connected to supply a current to said word selection circuit and connected to switch said current to said rejection circuit when said word is suppressed, (h) each of said ordering control circuits comprising a plurality of flip-flop condition detection circuits connected in cascade from the highest to the lowest order digit positions, (1) each of said condition detection circuits having an input connection and two output connections gated by cryotrons having control windings connected respectively in the branch circuits of the associated flip-flop for respectively indicating first and second conditions, (2) one of said conditions being the "zero" condition and the other being the "one" condition, (3) the first of said condition output connections being connected to provide the input signal to any lower order condition detection circuit of the associated order control circuit, (4) and said first condition output connection of the lowest order condition detection circuit comprising the ordering control circuit output indicating the extreme value word to be read out next, (5) the second of said condition output connections being normally connected to carry said word selection circuit current to said rejection circuit, (j) an "all second condition" detection circuit for each column arranged to indicate the second condition at all of the active current carrying condition detection circuits for that column comprising a plurality of cryotrons having gate circuits connected in series and having control windings respectively connected in said first condition connections to respond to any one of the first condition outputs from said condition detection circuits for that column for suppressing the operation of said "all second condition" detection circuit, (k) a coincidence circuit for each condition detection circuit comprising a cryotron having a control winding connected to receive the "all second condition" signal from the "all second condition" detection circuit of the associated column and having a cryotron gate circuit operable in response thereto to switch the current in each active second condition output connection from said rejection circuit to said word selection circuit, (l) and apparatus including cryotron switching devices responsive to a combination of a word selection output from any said ordering control circuit and word rejection outputs from rejection circuits at other word levels for reading out a single selected word and for then suppressing the word by switching the associated input circuit to supply the input current to the associated rejection circuit.

12. A memory system providing ordered read out of words in numerical sequence comprising:

(a) cryogenic storage flip-flops arranged in rows forming registers for the storage of a word in each row and having corresponding word flip-flops arranged in columns, (b) write-in circuits including a write-in register for temporary initial storage of each new word and transfer circuits for shifting the new word from said write-in register to the upper end storage register of said memory, (c) shifting circuit apparatus operable during the entry of a new word to shift words previously stored in storage registers above the uppermost empty word storage register so that each shifted word will occupy the next lower storage register to make room for said new word, (d) said shifting circuit apparatus including intermediate registers connected and arranged between said storage registers for intermediate storage of each word which is shifted downwardly, (e) a word selection circuit for each register comprising an ordering control circuit, (f) a word rejection circuit for each register, (g) an input circuit for each register connected to supply a current to said word selection circuit and connected to switch said current to said rejection circuit when said word is suppressed, (h) each of said ordering control circuits comprising a condition detection circuit for each flip-flop connected in cascade from the highest to the lowest order digit positions, (1) each of said condition detection circuits having an input connection and two output circuit connections containing cryotron gates controlled by control windings in the branches of the associated flip-flop for respectively indicating first and second conditions, (2) one of said conditions being the "zero" condition and the other being the "one" condition, (3) the first of said condition output connections being connected to provide the input signal to any lower order condition detection circuit of the associated order control circuit, (4) and said first condition output connection of the lowest order comprising the ordering control circuit output indicating the selected extreme value word, (5) the second of said condition output connections being normally connected through a cryotron gate to carry said word selection circuit current to said rejection circuit, (j) an "all second condition" detection circuit for each column arranged to indicate when all of the active current carrying condition detection circuits for that column are in the second condition and comprising cryotrons at each word level having gate circuits connected in series and having control windings respectively connected in said first condition circuit connections to respond to any one of the first condition outputs from said condition detection circuits for that column for suppressing the operation of said "all second condition" detection circuit, (k) the cryotron gates of said second condition output connections of said condition detection circuits having control windings connected to receive the "all second condition" signal from the "all second condition" detection circuit of the associated column and operable in response thereto to block the current in each active second condition output connection to said rejection circuit, (l) a separate alternate cryotron gated circuit connected to each second condition output connection for carrying said second condition circuit current back to said word selection circuit when said last mentioned cryotron gates are blocked, (m) and apparatus responsive to a combination of word selection outputs from said ordering control circuits and word rejection outputs from rejection circuits at other word levels for reading out the single selected word which is stored in the selected word register having a predetermined extreme positional relationship to said end storage register and for then suppressing the word by switching the associated input circuit to supply the input current to the associated rejection circuit.

References Cited by the Examiner

Pages 179–187, Dec. 13–15, 1960—Seeber, Jr., Associative Self-Sorting Memory, Proceedings of the Eastern Joint Computer Conference.

ROBERT C. BAILEY, *Primary Examiner.*